US012412382B2

(12) United States Patent
Subhash Dhok et al.

(10) Patent No.: US 12,412,382 B2
(45) Date of Patent: Sep. 9, 2025

(54) SYSTEM AND METHOD FOR ADAPTIVE RESOURCE-EFFICIENT MITIGATION OF CATASTROPHIC FORGETTING IN CONTINUOUS DEEP LEARNING

(71) Applicant: Accenture Global Solutions Limited, Dublin (IE)

(72) Inventors: Akshay Subhash Dhok, Mumbai (IN); Paritosh Pramanik, Bangalore (IN); Sourav Ghosh, Kolkata (IN); Jyoti Singh, Hyderabad (IN)

(73) Assignee: Accenture Global Solutions Limited, Dublin (IE)

( * ) Notice: Subject to any disclaimer, the term of this patent is extended or adjusted under 35 U.S.C. 154(b) by 475 days.

(21) Appl. No.: 17/978,205

(22) Filed: Oct. 31, 2022

(65) Prior Publication Data
US 2024/0144662 A1 May 2, 2024

(51) Int. Cl.
*G06V 10/82* (2022.01)
*G06V 10/774* (2022.01)

(52) U.S. Cl.
CPC .......... *G06V 10/82* (2022.01); *G06V 10/7753* (2022.01)

(58) Field of Classification Search
CPC ............................ G06V 10/82; G06V 10/7753
See application file for complete search history.

(56) References Cited

U.S. PATENT DOCUMENTS

| | | | |
|---|---|---|---|
| 11,461,591 B2* | 10/2022 | Ananthanarayanan | ...................... G06F 9/5038 |
| 2008/0071721 A1 | 3/2008 | Wang et al. | |
| 2008/0126556 A1 | 5/2008 | Perng et al. | |
| 2014/0300779 A1 | 10/2014 | Yeo et al. | |
| 2017/0330109 A1* | 11/2017 | Maughan | ................. G06N 5/04 |
| 2023/0076893 A1* | 3/2023 | Arani | ..................... G06N 3/045 |
| 2023/0177332 A1* | 6/2023 | Behpour | .................. G06N 3/08 706/25 |

OTHER PUBLICATIONS

Hasan M, Roy-Chowdhury AK. A continuous learning framework for activity recognition using deep hybrid feature models. IEEE Transactions on Multimedia. Sep. 7, 2015;17(11):1909-22. (Year: 2015).*

(Continued)

*Primary Examiner* — Fayyaz Alam
(74) *Attorney, Agent, or Firm* — Seed Intellectual Property Law Group LLP

(57) ABSTRACT

Aspects of the present disclosure provide systems, methods, and computer-readable storage media that support adaptive machine learning (ML) classification that mitigates effects of catastrophic forgetting while reducing overall resource requirements. To illustrate, a computing device may train first and second ML classifiers based on historical streamed data. The second ML classifier is trained to use continuous learning, and the first ML classifier is not. If data drift of a data stream is below a lower threshold, the data stream is provided as input to the first ML classifier to generate classification output (e.g., predictions). If the data drift is above the lower threshold, dynamic switching occurs and the data stream is provided as input to the second ML (Continued)

classifier instead of the first ML classifier to generate the classifier output. If the data drift is above an upper threshold, operations are performed to train new ML classifiers.

20 Claims, 5 Drawing Sheets

(56) References Cited

OTHER PUBLICATIONS

Brzezinski, D. et al. "Reacting to Different Types of Concept Drift: The Accuracy Updated Ensemble Algorithm," IEEE Transactions on Neural Networks and Learning Systems, vol. 25, No. 1, Jan. 2014, 14 pages.
European Patent Office, Communication, Extended European Search Report issued for European Patent Application No. 23156973.2, dated Jul. 19, 2023, 9 pages.
Chen, Z. & Liu, B. (2018). Continual Learning and Catastrophic Forgetting. In Ronald J. Brachman & Peter Stone (Eds.), Lifelong Machine Learning (2nd ed., pp. 55-75). Morgan & Claypool Publishers, 21 pages.
Tahir, G. A. et al., "Mitigating Catastrophic Forgetting in Adaptive Class Incremental Extreme Learning Machine Through Neuron Clustering," 2020 IEEE International Conference on Systems, Man, and Cybernetics (SMC), Toronto, ON, Canada, Oct. 2020, pp. 3903-3910, 8 pages.
He, Y. et al. "CLeaR: An Adaptive Continual Learning Framework for Regression Tasks," AI Perspectives, 2021, vol. 3, No. 2, 16 pages.
Yang, Y. et al. "Adaptive Deep Models for Incremental Learning: Considering Capacity Scalability and Sustainability," KDD '19: Proceedings of the 25th ACM SIGKDD International Conference on Knowledge Discovery & Data Mining, Jul. 2019, pp. 74-82, 9 pages.
Brownlee, J. "Dynamic Ensemble Selection (DES) for Classification in Python," Machine Learning Mastery, Ensemble Learning, Apr. 27, 2021, https://machinelearningmastery.com/dynamic-ensemble-selection-in-python/, 21 pages.
Rathod, A. "How to Apply Continual Learning to Your Machine Learning Models," Jul. 11, 2019, https://www.darbaar.com/apply-continual-learning-to-machine-learning-models/, 10 pages.
First Examination Report, Indian App. No. 202344072948 dated Oct. 26, 2023.
Jicheng Shan , Hang Zhang, Weike Liu, and Qingbao Liu, "Online Active Learning Ensemble Framework for Drifted Data Streams," in IEEE Transactions on Neural Networks and Learning Systems, vol. 30, No. 2, pp. 486-498, Feb. 2019 <<doi: 10.1109/TNNLS.2018.2844332>>.

\* cited by examiner

SYSTEM AND METHOD FOR ADAPTIVE RESOURCE-EFFICIENT MITIGATION OF CATASTROPHIC FORGETTING IN CONTINUOUS DEEP LEARNING

TECHNICAL FIELD

The present disclosure relates generally to systems and methods for implementing continuous deep learning to solve machine learning and artificial intelligence tasks. In particular implementations, the aspects described herein provide for mitigating the effects of catastrophic forgetting in continuous learning and leveraging adaptively using continuous learning and other machine learning to reduce overall processing and memory resource requirements.

BACKGROUND

Machine learning (ML) and artificial intelligence (AI) technology have been leveraged to provide advanced data processing and analytics functions, image and facial recognition functions, and many other types of computer functionality. For example, ML models have been trained to predict network errors based on network measurement data or to predict whether an input image or video includes a user's face. Typically, ML and AI classifiers are trained on labeled (e.g., categorized) historic data to recognize underlying patterns or similarities in the various categories of the historic data, and once trained, the classifier outputs a prediction for what category (e.g., label) corresponds to an unlabeled input. Because training such classifiers can be time and resource intensive, ML classifiers are typically trained before being put into service, and then updated or partially retrained using the generated predictions and confirmed labels as feedback data.

Such training using feedback data may improve the accuracy of an ML classifier, but is usually not sufficient to provide new learnings if the profile of the input data significantly changes. However, in real-time or near real-time analytics, insights or decisions may need to be obtained instantly based on an incoming data stream rather than static data stored in repositories. This is because, in such business scenarios, insights or decisions are based on incremental information and are perishable in the sense that latency between the incoming data and the decisions that are drawn based on this data may significantly reduce usefulness of the decisions. It is not surprising, therefore, that real-time analytics has gained considerable attention in recent years. Some applications of real-time analytics using streaming data include financial fraud detection, purchase recommendation, weather forecasting, network management, operations research, security surveillance, and algorithmic trade using stock market data.

Using streaming data as training data and input data for ML classifiers and other ML models presents a number of challenges. One challenge is that ML models need to acquire new learnings (e.g., be retrained) so that they do not become outdated while the statistical properties (e.g., profiles) of the current data stream window may evolve or change over time, a behavior commonly known as "concept drift" or "data drift." Periodically retraining ML models using historical data and a rapidly increasing volume of streaming data quickly becomes infeasible. Instead, one approach is to develop ML models that may be retrained as time progresses using newer windows of the data stream to continually generate new learnings from the data. Deep learning neural networks (DL networks) have proven particularly effective for use in retraining scenarios, as DL networks are expected to remember previous knowledge and to incorporate information (e.g., learnings) from additional training based on new data due to the infeasibility to be retrained using an entirety of all historical data. In order to continually learn new representations of data, DL networks usually unlearn some prior representations of the data on which the DL networks were previously trained in order to replace them with new representations of the current training data.

While DL networks can achieve high performance on prediction (e.g., classification) tasks in situations in which the overall profile of the current data stream is relatively similar to the profile(s) of previous training data, DL networks typically do not achieve the same high performance in situations where there is significant concept drift between the training data and the current data stream. Stated another way, conventional DL networks have difficulty adapting continuously in dynamic environments where data profiles can significantly change over time. However, such adaptation is a key feature for any intelligent scheme. One approach to adapt to such situations is a framework referred to as continuous learning, in which ML model parameters can be updated incrementally as data streams progressively come in. Continual learning models and systems are required to learn from their own experiences and must be capable of progressively obtaining, adjusting, and transferring knowledge over a long period. This capacity to continually learn new tasks over time while retaining previously learned knowledge is the origin of the continuous learning moniker.

One problem with continuous learning is that the retrained (e.g., updated) DL network should not interfere with previously learned knowledge by forgetting the previously learned knowledge from preceding data distributions, a phenomenon known as "catastrophic forgetting." To address this problem, architectural changes alter DL network architecture to reduce the interference between the old and the new tasks without altering the objective function. The architectural change freezes the weight update of certain neurons in the DL network so that they remain closely similar to those of the original DL network, thereby doing well on previously learned tasks while minimizing the catastrophic forgetting. Another approach to address the problem of catastrophic forgetting is a progressive network. A progressive network augments a new feature layer to the previous network, which mitigates catastrophic forgetting but increases the computational and architectural complexity of the progressive network with each new task. When more tasks are introduced sequentially, architectural intricacy enlarges unchecked, making progressive networks not scalable due to processing and memory resource constraints of most devices. Dropout is another approach to continuous learning to mitigate the problem of catastrophic forgetting. Dropout is designed to regularize DL networks to improve the generalization capacity. Optimally designed dropout networks are less susceptible to catastrophic forgetting than traditional DL networks, whose primary purpose is to perform well on the first task. Other approaches include a regularization approach imposes constraints on the updating mechanism of the DL parameter weights, entirely averting the update of weights assigned to old tasks, or decreasing the learning rate to prevent major alteration in the DL network parameters while commencing the training with new data. While these approaches have achieved varying levels of success in reducing catastrophic forgetting, some are more successful in limited situations, and many are not scalable to scenarios with substantial concept drift due to intractable increases in processing and memory resource requirements.

SUMMARY

Aspects of the present disclosure provide systems, methods, apparatus, and computer-readable storage media that support adaptive machine learning classification that mitigates effects of catastrophic forgetting while also reducing overall processing and memory resource requirements. In order to mitigate catastrophic forgetting with fewer processing and memory resource requirements than conventional continuous learning systems, one or more aspects described herein adaptively determine assignment of streaming data between a pretrained machine learning (ML) classifier that does not use continuous learning, and therefore is less complex and requires less resource use and power consumption, and an ML classifier that is trained to perform continuous learning (e.g., a continuous learning ML classifier). The assignment of the streaming data as input may be dynamically switched from one type of ML classifier to the other type of ML classifier based on characteristics of the streaming data, such as data drift (e.g., concept drift). In this manner, the more resource-intensive continuous learning ML classifier may only be used to compensate for increases in data drift that sufficiently degrade performance of the less complex ML classifier, thereby reducing processing and memory requirements as compared to conventional continuous learning-based systems while also mitigating the effects of catastrophic forgetting as compared to conventional ML systems that do not employ continuous learning.

To illustrate, a server or other computing device may train a first ML classifier and a second ML classifier based on historical streamed data. The first ML classifier is trained to perform classification without using continuous learning and the second ML classifier is trained to perform classification using continuous learning. Thus, the first ML classifier may be less complex and consume less power to use than the second ML classifier. As a non-limiting example, the first ML classifier may be a neural network trained with gradient descent loss and the second ML classifier may be a deep learning neural network (DL network) that is trained with a parameter weight regularization or consolidation loss function. While a data drift of an unlabeled data stream with respect to the historical streamed data is less than a lower threshold, the computing device may provide the unlabeled data stream to the first ML classifier to predict labels for the unlabeled data stream (e.g., generate a classification output). The data drift may be estimated or measured using one or more techniques, such as adaptive windowing (ADWIN), as a non-limiting example. However, when the data drift satisfies the lower threshold, the computing device may provide the unlabeled data stream to the second ML classifier instead of the first ML classifier to continue predicting labels for the unlabeled data stream with the improved performance provided by the continuous learning framework of the second ML classifier. If the data drift decreases such that it no longer satisfies (e.g., falls below) the lower threshold, the computing device may return to providing the unlabeled data stream to the first ML classifier instead of the second ML classifier to reduce resource use and power consumption in a situation in which the performance of the first ML classifier is sufficient.

Additionally, aspects of the present disclosure support training multiple new ML classifiers if the properties of the streaming data change such that the catastrophic forgetting mitigation provided by the continuous learning ML classifier is degraded due to a significant increase in the data drift. In such situations, the labels predicted by the second ML classifier may no longer have sufficiently improved accuracy to justify the increased computational resource use and power consumption. Accordingly, the computing device may perform clustering on a current window of the streaming data to identify multiple different data profile clusters, and each data profile cluster may be used to generate training data for training a corresponding new ML classifier. Each of the new ML classifiers are trained to perform classification without using continuous learning. The streaming data may then be sampled and dynamically assigned to the new ML classifier associated with the least distance (e.g., Euclidean distance) between the sample and a centroid of the corresponding data profile cluster. If the characteristics of the streaming data continue to significantly drift, the above-described process can be repeated. For example, a continuous learning ML classifier can be trained using the training data based on each of the multiple data profile clusters, and if the data drift increases beyond a threshold for one of the new less complex ML classifiers, the streaming data can be adaptively assigned to the corresponding new continuous learning ML classifier. Additionally, if the data drift continues beyond a threshold for the new continuous learning ML classifier, additional clustering may be performed for generating additional training data for newer ML classifiers.

To illustrate, if the computing device is providing the unlabeled data stream to the second ML classifier and the data drift increases such that the data drift satisfies an upper threshold, the computing device may initiate a process to train additional ML classifiers that perform classification without using continuous learning in order to improve performance in view of the significant data drift from the training data for the original two ML classifiers. First, the computing device performs clustering, such as affinity propagation clustering, on a current window (e.g., a portion) of the unlabeled data stream to segment the current data into multiple data profile clusters. The number of data profile clusters may correspond to the number of distinct profiles represented in current window of the unlabeled data stream, with each cluster including data samples that are closest to a corresponding data profile. After performing the clustering, the computing device may train new ML classifiers using each of the data profile clusters (and some or all of historical streaming data) as training data for a corresponding new ML classifier. Each of these new ML classifiers is a lower complexity ML classifier that is trained to perform classification without using continuous learning. As an illustrative example, if the clustering results in three data profile clusters, the computing device may train a first new ML classifier based on training data representing a first data profile cluster, a second new ML classifier based on training data representing a second data profile cluster, and a third new ML classifier based on training data representing a third data profile cluster. Once the new ML classifiers are trained, the computing device may sample the unlabeled data stream to determine which of the new ML classifiers is to receive the unlabeled data stream as input at a given time (e.g., for a given window of the unlabeled data stream). With respect to the above-described example with three new ML classifiers, the computing device may determine a distance (e.g., a Euclidean distance) between an input sample and the first data profile cluster, a distance between the input sample and the second data profile cluster, and a distance between the input sample and the third data profile cluster, and the unlabeled data stream may be assigned as input to the new ML classifier that corresponds to the data profile cluster associated with the shortest of the three distances (e.g., this data profile cluster may be referred to as the closest data profile cluster).

The sampling may be performed periodically or based on a trigger condition such that other windows (e.g., portions) of the unlabeled data stream may be provided as input to different new ML classifiers if characteristics of the unlabeled data stream during the current window change such that a different data profile cluster becomes the closest to input sample(s) from the current window. In some such implementations, the above described operations adaptively assigning the unlabeled data stream to continuous learning ML classifiers and the clustering of the unlabeled data stream for training new ML models may be repeated with respect to each of the new ML classifiers. To illustrate, new continuous learning ML classifiers may also be trained based on the training data derived from the data profile clusters, and if the data drift of the unlabeled data stream is between a new lower threshold and a new upper threshold associated with a pair of new ML classifiers (e.g., a less complex ML classifier and a corresponding continuous learning ML classifier), the unlabeled data stream may be reassigned from the new ML classifier to a corresponding new continuous learning ML classier. Additionally, if the data drift increases beyond the new upper threshold, additional clustering may be performed for training of more new ML models, in a similar manner to as described above.

In a particular aspect, a method for adaptive machine learning classification that mitigates effects of catastrophic forgetting includes receiving, by one or more processors, an unlabeled data stream. The method also includes providing, by the one or more processors, the unlabeled data stream as input to a first ML classifier to generate classification output. The first ML classifier is trained based on historical streamed data to perform classification without using continuous learning. The method includes determining, by the one or more processors, whether data drift of the unlabeled data stream satisfies (e.g., is greater than) a lower threshold. The method further includes providing, by the one or more processors and based on the data drift satisfying the lower threshold, the unlabeled data stream as input to a second ML classifier instead of the first ML classifier to generate the classification output. The second ML classifier is trained to perform classification using continuous learning.

In another particular aspect, a system for adaptive machine learning classification that mitigates effects of catastrophic forgetting includes a memory and one or more processors communicatively coupled to the memory. The one or more processors are configured to receive an unlabeled data stream. The one or more processors are also configured to provide the unlabeled data stream as input to a first machine learning (ML) classifier to generate classification output. The first ML classifier is trained based on historical streamed data to perform classification without using continuous learning. The one or more processors are configured to determine whether data drift of the unlabeled data stream satisfies a lower threshold. The one or more processors are further configured to, based on the data drift satisfying the lower threshold, provide the unlabeled data stream as input to a second ML classifier instead of the first ML classifier to generate the classification output. The second ML classifier is trained to perform classification using continuous learning.

In another particular aspect, a non-transitory computer-readable storage medium stores instructions that, when executed by one or more processors, cause the one or more processors to perform operations for adaptive machine learning classification that mitigates effects of catastrophic forgetting. The operations include receiving an unlabeled data stream. The operations also include providing the unlabeled data stream as input to a first machine learning (ML) classifier to generate classification output. The first ML classifier is trained based on historical streamed data to perform classification without using continuous learning. The operations include determining whether data drift of the unlabeled data stream satisfies a lower threshold. The operations further include, based on the data drift satisfying the lower threshold, providing the unlabeled data stream as input to a second ML classifier instead of the first ML classifier to generate the classification output. The second ML classifier is trained to perform classification using continuous learning.

The foregoing has outlined rather broadly the features and technical advantages of the present disclosure in order that the detailed description that follows may be better understood. Additional features and advantages will be described hereinafter which form the subject of the claims of the disclosure. It should be appreciated by those skilled in the art that the conception and specific aspects disclosed may be readily utilized as a basis for modifying or designing other structures for carrying out the same purposes of the present disclosure. It should also be realized by those skilled in the art that such equivalent constructions do not depart from the scope of the disclosure as set forth in the appended claims. The novel features which are disclosed herein, both as to organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present disclosure, reference is now made to the following descriptions taken in conjunction with the accompanying drawings, in which.

Figure 1:
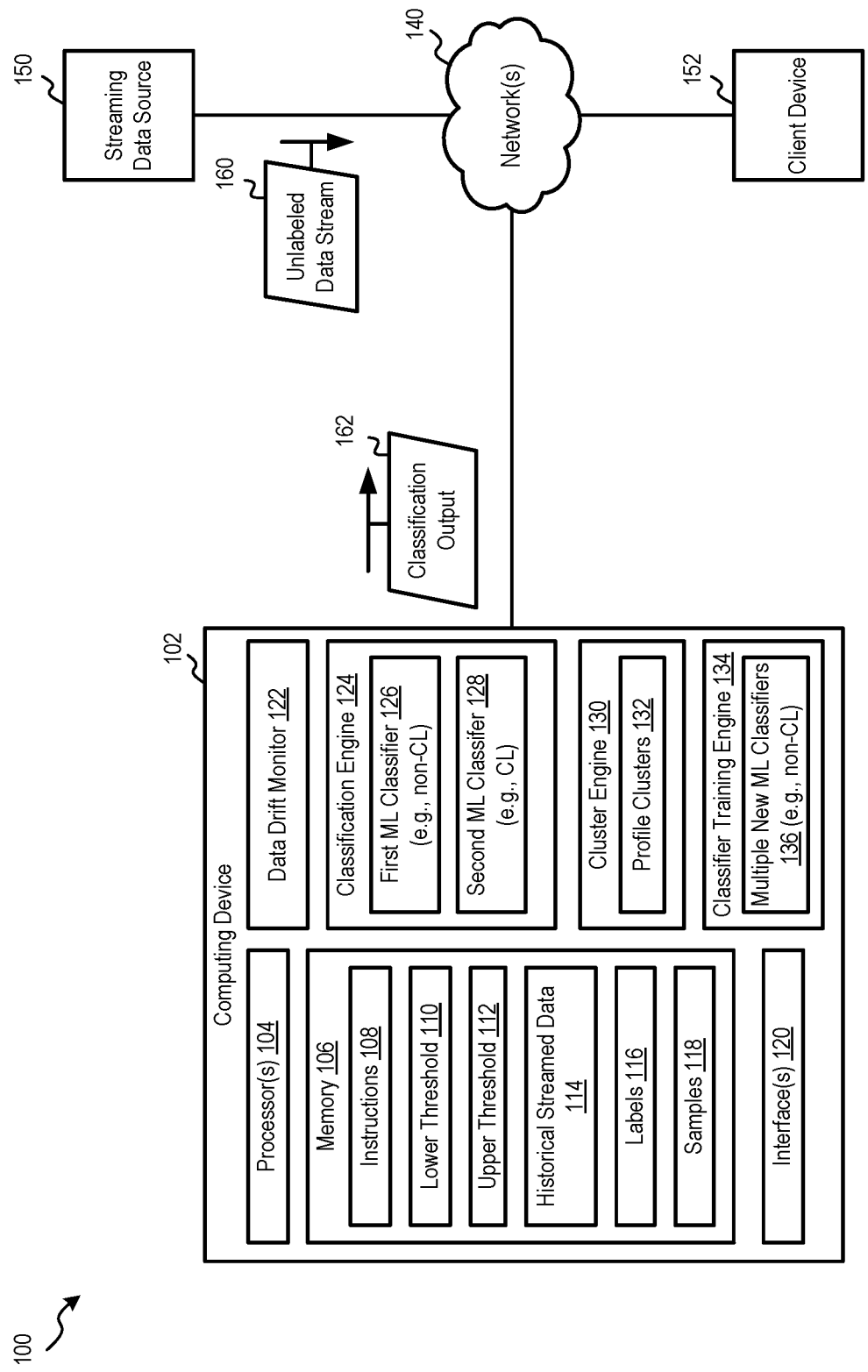
FIG. 1 is a block diagram of an example of a system that supports adaptive machine learning classification that mitigates effects of catastrophic forgetting according to one or more aspects.

It should be understood that the drawings are not necessarily to scale and that the disclosed aspects are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular aspects illustrated herein.

DETAILED DESCRIPTION

Aspects of the present disclosure provide systems, methods, apparatus, and computer-readable storage media that support adaptive machine learning classification that mitigates effects of catastrophic forgetting while also reducing overall processing and memory resource requirements. In order to mitigate catastrophic forgetting with fewer processing and memory resource requirements than conventional continuous learning systems, one or more aspects described herein adaptively determine assignment of streaming data between a pretrained machine learning (ML) classifier that does not use continuous learning, and therefore is less complex and requires less resource use and power consumption, and an ML classifier that is trained to perform continuous learning (e.g., a continuous learning ML classifier). The assignment of the streaming data as input may be dynamically switched from one type of ML classifier to the other type of ML classifier based on characteristics of the streaming data, such as data drift (e.g., concept drift). In this manner, the more resource-intensive continuous learning ML classifier may only be used to compensate for increases in data drift that sufficiently degrade performance of the less complex ML classifier, thereby reducing processing and memory requirements as compared to conventional continuous learning-based systems while also mitigating the effects of catastrophic forgetting as compared to conventional ML systems that do not employ continuous learning.

Additionally, aspects of the present disclosure support training multiple new ML classifiers if the properties of the streaming data change such that the catastrophic forgetting mitigation provided by the continuous learning ML classifier is degraded due to a significant increase in the data drift. In such situations, the labels predicted by the second ML classifier may no longer have sufficiently improved accuracy to justify the increased computational resource use and power consumption. Accordingly, the computing device may perform clustering on a current window of the streaming data to identify multiple different data profile clusters, and each data profile cluster may be used to generate training data for training a corresponding new ML classifier. Each of the new ML classifiers are trained to perform classification without using continuous learning. The streaming data may then be sampled and dynamically assigned to the new ML classifier associated with the least distance (e.g., Euclidean distance) between the sample and a centroid of the corresponding data profile cluster. If the characteristics of the streaming data continue to significantly drift, the above-described process can be repeated. For example, a continuous learning ML classifier can be trained using the training data based on each of the multiple data profile clusters, and if the data drift increases beyond a threshold for one of the new less complex ML classifiers, the streaming data can be adaptively assigned to the corresponding new continuous learning ML classifier. Additionally, if the data drift continues beyond a threshold for the new continuous learning ML classifier, additional clustering may be performed for generating additional training data for newer ML classifiers.

One important difficulty in conventional ML classification systems that is addressed by the systems, methods, and computer readable media of the present disclosure, as further described herein, is mitigation of catastrophic forgetting caused by the presence of significant data drift (e.g., concept drift) in incoming data streams. Concept drift refers to the change in statistical properties in a data stream as time elapses, similar to the way people's preferences and behaviors change over time in response to ever-changing socio-economic dynamics. Mathematically, concept drift can be denoted as, $P_t \neq P_{t+\Delta}$, where $P_t$ and $P_{t+\Delta}$ indicate the statistical distribution of data at time t and t+$\Delta$, respectively. The statistical distribution of the data may change in such a manner that some classes, while deciding a class label, may not comply with previously derived decision boundaries within a specific feature space. The presence of concept drift causes problems because training data and test data profiles change over time for ML classifiers, and thus the predictions output by the ML classifiers become less accurate as time passes if the ML classifiers are not retrained using a current window of the data stream. However, such retraining of the ML classifier may cause the ML classifier to systematically forget previously learned knowledge, also referred to as the problem of catastrophic forgetting. Catastrophic forgetting is a typical problem encountered in many ML algorithms. For example, an ML classifier trained on one task (e.g., an "old task") and then subsequently trained on another task (e.g., a "new task") may "forget" how to work on the original task (e.g., the old task). Catastrophic forgetting is widely acknowledged to be a serious problem with conventional ML classifiers in the realm of dynamically changing streaming data.

Statisticians, as well as ML engineers, have mostly been concerned with fitting an ML classifier to an available training dataset and deploying the ML classifier into production. Continuous learning has been researched to deal with the problems of static ML classifiers failing to adapt to dynamically changing data, such that ML classifiers that are able to be retrained whenever new data is available while, at the same time, trying to address catastrophic forgetting. However, effects of catastrophic forgetting are still an issue for many conventional continuous learning classifiers. Additionally, techniques that have shown improvements in mitigating the effects of catastrophic forgetting typically require significant computational and memory resources, and consume significant power, making such techniques not scalable for most (or any) computing devices. To address these difficulties, aspects of the present disclosure describe a system that dynamically uses both less complex ML classifiers that perform classification without continuous learning and more complex continuous learning ML classifiers on a binary classification problem in a streaming data context to mitigate the effects of catastrophic forgetting in a resource-efficient and scalable manner. Some implementations of continuous learning ML classifiers described herein add penalties to loss functions used in the continuous learning to improve performance on previous tasks (e.g., reduce catastrophic forgetting) without becoming computationally burdensome to the point that use of the loss function is not scalable above a few tasks, such as two, three, or four total tasks. Additionally, aspects of the present disclosure provide for identification of data drift that is significant enough to degrade performance of the continuous learning ML classifier, and in such situations provides for clustering of the data stream to identify multiple different data profiles represented by the data stream for use in training corresponding new ML classifiers in situations when the originally trained ML classifiers no longer provide classification within target metrics. As such, the dynamic adaptive ML classification described herein may provide more accurate classifications for high volume streaming data while balancing the competing goals of mitigating the effects of catastrophic forgetting and reducing resource use and power consumption such that the classification is scalable to larger number of tasks, thereby providing significant improvements over both conventional static ML classifiers and conventional continuous learning ML classifiers.

Referring to FIG. 1, an example of a system that supports adaptive machine learning classification that mitigates effects of catastrophic forgetting according to one or more aspects is shown as a system 100. The system 100 may be configured to dynamically assign unlabeled streaming data to different ML classifiers based on characteristics of the streaming data to balance competing considerations of improved classification performance and efficient computational and memory resource use. Although described in the context of ML classification, one or more aspects described herein may be leveraged to provide adaptive architecture for systems performing other types of ML tasks instead of classification (e.g., prediction), such as regression, clustering, estimation, visualization, projection, or the like. As shown in FIG. 1, the system 100 includes a computing device 102, a streaming data source 150, a client device 152, and one or more networks 140. In some implementations, the system 100 may include more or fewer components than are shown in FIG. 1, such as additional client devices or data sources, or the client device 152 may be omitted, as non-limiting examples.

The computing device 102 may be configured to support one or more ML services, such as an ML classification service (e.g., prediction service). The computing device 102 may include or correspond to a server, a desktop computing device, a laptop computing device, a personal computing device, a tablet computing device, a mobile device (e.g., a smart phone, a tablet, a personal digital assistant (PDA), a wearable device, and the like), a server, a virtual reality (VR) device, an augmented reality (AR) device, an extended reality (XR) device, a vehicle (or a component thereof), an entertainment system, other computing devices, or a combination thereof, as non-limiting examples. In the example shown in FIG. 1, the computing device 102 includes one or more processors 104, a memory 106, one or more communication interfaces 120, a data drift monitor 122, a classification engine 124, a cluster engine 130, and a classifier training engine 134. In some other implementations, one or more of the components may be optional, one or more additional components may be included in the computing device 102, or both. It is noted that functionalities described with reference to the computing device 102 are provided for purposes of illustration, rather than by way of limitation, and that the exemplary functionalities described herein may be provided via other types of computing resource deployments. For example, in some implementations, computing resources and functionality described in connection with the computing device 102 may be provided in a distributed system using one or more servers or other computing devices, or in a cloud-based system using computing resources and functionality provided by a cloud-based environment that is accessible over a network, such as the one of the one or more networks 140. To illustrate, one or more operations described herein with reference to the computing device 102 may be performed by one or more servers or a cloud-based system that communicates with one or more client or user devices in order to provide ML classification services (or other ML services). Additionally or alternatively, although components 122, 124, 130, and 134 are illustrated and described separately, any or all of these components may be implemented as dedicated hardware, circuitry, firmware, logic, software, or a combination thereof, distinct from the one or more processors 104 and the memory 106, or the operations of any or all of components 122, 124, 130, and 134 may be performed by the one or more processors 104 and the memory 106 in accordance with the description herein, such that one or more of components 122, 124, 130, and 134 are individually illustrated and referenced for ease of explanation.

The one or more processors 104 may include one or more microcontrollers, application specific integrated circuits (ASICs), field programmable gate arrays (FPGAs), central processing units (CPUs) having one or more processing cores, or other circuitry and logic configured to facilitate the operations of the computing device 102 in accordance with aspects of the present disclosure. The memory 106 may include random access memory (RAM) devices, read only memory (ROM) devices, erasable programmable ROM (EPROM), electrically erasable programmable ROM (EEPROM), one or more hard disk drives (HDDs), one or more solid state drives (SSDs), flash memory devices, network accessible storage (NAS) devices, or other memory devices configured to store data in a persistent or non-persistent state. Software configured to facilitate operations and functionality of the computing device 102 may be stored in the memory 106 as instructions 108 that, when executed by the one or more processors 104, cause the one or more processors 104 to perform the operations described herein with respect to the computing device 102, as described in more detail below. Additionally, the memory 106 may be configured to store data and information, such as a lower threshold 110, an upper threshold 112, historical streamed data 114, one or more labels (referred to herein as "labels 116"), and one or more samples (referred to herein as "samples 118"). Additionally or alternatively, the memory 106 and/or the one or more processors 104 may be configured to store one or more parameters, hyperparameters, other configuration information, or the like, for implementing ML classifiers (e.g., ML models), such as a first ML classifier 126, a second ML classifier 128, and multiple new ML classifiers 136. Illustrative aspects of the lower threshold 110, the upper threshold 112, the historical streamed data 114, the labels 116), the samples 118, the first ML classifier 126, the second ML classifier 128, and the multiple new ML classifiers 136 are described in more detail below.

The one or more communication interfaces 120 may be configured to communicatively couple the computing device 102 to the one or more networks 140 via wired or wireless communication links established according to one or more communication protocols or standards (e.g., an Ethernet protocol, a transmission control protocol/internet protocol (TCP/IP), an Institute of Electrical and Electronics Engineers (IEEE) 802.11 protocol, an IEEE 802.16 protocol, a 3rd Generation (3G) communication standard, a 4th Generation (4G)/long term evolution (LTE) communication standard, a 5th Generation (5G) communication standard, and the like). In some implementations, the computing device 102 includes one or more input/output (I/O) devices that include one or more display devices, a keyboard, a stylus, one or more touchscreens, a mouse, a trackpad, a microphone, a camera, one or more speakers, haptic feedback devices, or other types of devices that enable a user to receive information from or provide information to the computing device 102. In some implementations, the computing device 102 is coupled to a display device, such as a monitor, a display (e.g., a liquid crystal display (LCD) or the like), a touch screen, a projector, a virtual reality (VR) display, an augmented reality (AR) display, an extended reality (XR) display, or the like. In some other implementations, the display device is included in or integrated in the computing device 102. Additionally or alternatively, the computing device 102 may be communicatively coupled to one or more client devices (e.g., the client device 152) that include or are coupled to or include respective display devices. For example, a user (e.g., an administrator, a subscriber to an ML classification service, or the like) may interact with the computing device 102 by using the client device 152, or any type of user device, to communicate with the computing device 102 via the networks 140.

The data drift monitor 122 is configured to monitor data drift (e.g., concept drift) in streaming data received by the computing device 102. In some implementations, the data drift monitor 122 is configured to determine (e.g., estimate) the data drift using an Adaptive Windowing (ADWIN) method for concept drift detection. In some other implementations, the data drift monitor 122 may be configured to use other drift detection methods, such as Drift Detection Method (DDM), Early Drift Detection Method (EDDM), Drift Detection Method based on Hoeffding's bounds with moving weighted average-test (HDDM_W), Kolmogorov-Smirnov Windowing method for concept drift detection (KSWIN), Page-Hinkley method for concept drift detection, or the like. The data drift monitor 122 may compare the determined data drift to one or more thresholds, such as the lower threshold 110, the upper threshold 112, or both, and notify other components when the data drift satisfies the one or more thresholds for initiating operations at the other components, such as the classification engine 124, the cluster engine 130, the classifier training engine 134, or a combination thereof.

The classification engine 124 is configured to perform classification on input data to generate and output classification outputs (e.g., predictions) based on the input data. The classification engine 124 includes, integrates, or has access to multiple different types of ML classifiers that are trained to perform classification, including ML classifiers that are trained to perform classification without using continuous learning, such as the first ML classifier 126 (e.g., a non-continuous learning (non-CL) classifier), and ML classifiers that are trained to perform classification using continuous learning, such as the second ML classifier 128 (e.g., a CL classifier). For example, the first ML classifier 126 and the second ML classifier 128 may output predictions of whether input data corresponds to a particular label or group, or which label/group of a plurality of labels/groups that the input data is predicted to correspond. As a non-limiting example, the first ML classifier 126 and the second ML classifier 128 may be configured to predict whether input data representing customer data, transaction data, and the like represents a fraudulent credit card charge. The first ML classifier 126 and the second ML classifier 128 may be implemented by one or more ML or artificial intelligence (AI) models, which may include or correspond to one or more neural networks (NNs), such as multi-layer perceptron (MLP) networks, convolutional neural networks (CNNs), recurrent neural networks (RNNs), deep neural networks (DNNs), deep learning neural networks (DL networks), long short-term memory (LSTM) NNs, or the like. In other implementations, the ML classifiers may be implemented as one or more other types of ML models, such as support vector machines (SVMs), decision trees, random forests, regression models, Bayesian networks (BNs), dynamic Bayesian networks (DBNs), naive Bayes (NB) models, Gaussian processes, hidden Markov models (HMMs), regression models, or the like. Because the first ML classifier 126 is a non-CL classifier and the second ML classifier 128 is a CL classifier, the first ML classifier 126 may be less complex, and thus have less computational and memory resource requirements and consume less power, than the second ML classifier 128.

The cluster engine 130 is configured to perform clustering operations on input data to segment the input data into multiple different clusters corresponding to different data profiles represented within the input data. For example, each data sample from the input data may be assigned to one of profile clusters 132 (e.g., data profile clusters) as a result of performance of the clustering operations. In some implementations, the cluster engine 130 is configured to perform affinity propagation clustering on input data to generate the profile clusters 132. In other implementations, the cluster engine 130 may be configured to perform clustering based on other clustering algorithms, such as K-Means, K-Modes, or the like.

The classifier training engine 134 is configured to train ML classifiers for use by the classification engine 124. The training may include initial training, updated training (e.g., based on feedback data, backpropagation, etc.), retraining of non-CL classifiers, incremental or continuing retraining of CL classifiers, training of new classifiers (new non-CL classifiers, new CL classifiers, or both), or a combination thereof. For example, the classifier training engine 134 may be configured to train the first ML classifier 126 and the second ML classifier 128 prior to being put into service by the classification engine 124. As another example, the classifier training engine 134 may be configured to train the multiple new ML classifiers 136, such as at a time when the data drift is significantly high to render the first ML classifier 126 and the second ML classifier 128 less effective than one or more target metrics. The classifier training engine 134 is configured to train ML classifiers based on labeled streamed data, such as the historical streamed data 114 and portions of received streaming data that have been processed and labeled (e.g., based on other applications, based on manual labeling by users, or the like).

The streaming data source 150 is configured to communicate with the computing device 102 via the one or more networks 140 to enable streaming data to be provided to or accessed by the computing device 102. The streaming data source 150 may include one or more servers, one or more data feeds, one or more databases, one or more other devices or systems, or a combination thereof, that provide streaming data (e.g., one or more data streams or data feeds) of data to be classified. The client device 152 is configured to communicate with the computing device 102 via the one or more networks 140 to enable user interaction with the services provided by the computing device 102. For example, the client device 152 may be a device associated with a subscriber of ML classification services provided by the computing device 102 (e.g., a server or cloud-based system), and the client device 152 may communicate with the computing device 102 to initiate ML classification services, to indicate a source of incoming data (e.g., the streaming data source 150), to receive predictions (e.g., classifications) output by the computing device 102, or the like. The client device 152 may include or correspond to a computing device, such as a desktop computing device, a server, a laptop computing device, a personal computing device, a tablet computing device, a mobile device (e.g., a smart phone, a tablet, a PDA, a wearable device, and the like), a VR device, an AR device, an XR device, a vehicle (or component(s) thereof), an entertainment system, another computing device, or a combination thereof, as non-limiting examples. Although depicted as including a single client device 152, the system 100 is not so limited. For example, the system 100 may include a plurality of client devices 152 associated with a plurality of clients, and some clients may access and/or communicate with the computing device 102 using multiple devices.

During operation of the system 100, the computing device 102 may receive an instruction to initiate performance of ML classification services for input data received from the streaming data source 150. For example, the client device 152 (or another source) may provide the instruction to initiate performance of the ML classification services to the computing device 102. The computing device 102 may train at least one ML classifier to perform classification in order to perform the requested ML classification services. For example, the classifier training engine 134 may generate training data based on the historical streamed data 114 to use in training the first ML classifier 126 to perform classification without using continuous learning (e.g., the first ML classifier 126 is trained as a non-CL classifier). The historical streamed data 114 includes labeled data similar to the type of data expected to be received from the streaming data source 150, such that ML classifiers can be trained to predict one of the labels indicated by the historical streamed data 114 as corresponding to incoming unlabeled data. In some implementations, the classifier training engine 134 may train the second ML classifier 128 at least partially concurrently with training of the first ML classifier 126. The classifier training engine 134 may train the second ML classifier 128 using training data based on the historical streamed data 114 to train the second ML classifier to perform classification using continuous learning (e.g., the second ML classifier 128 is trained as a CL classifier). In some implementations, the classifier training engine 134 may train the second ML classifier 128 using an elastic weight consolidation (EWC) technique, an online elastic weight consolidation (OEWC) technique, another loss function-based technique, such as one referred to herein as a "robust elastic weight consolidation" (REWC) technique, another continuous learning algorithm or framework, or a combination thereof, as further described below with reference to FIG. 2 An example architecture and operations of a CL classifier are described in more detail herein, with reference to FIG. 3. The second ML classifier 128 may also be trained using input data received by the computing device 102 after the input data is analyzed to determine corresponding data, if there is sufficient time for receipt of input data and determination of the labels prior to use of the second ML classifier 128. In some other implementations, the classifier training engine 134 may not begin training the second ML classifier 128 until a time that the second ML classifier 128 is needed to be put into service, thereby providing additional time for the training data to be based on the historical streamed data 114 and at least some analyzed and labeled input data.

Once the first ML classifier 126, and optionally the second ML classifier 128, have been trained and put into service, the computing device 102 begins receiving input streaming data and performing classification operations to generate predictions based on the input streaming data. For example, the computing device 102 may receive or access an unlabeled data stream 160 from the streaming data source 150, and the computing device 102 may provide the unlabeled data stream 160 as input to classification engine 124 to generate classification output 162 that represents predictions based on the received unlabeled data. As a non-limiting example, the classification output 162 may represent predictions of whether the unlabeled data stream 160 represents transactions that correspond to credit card fraud. The classification output 162 may be a streaming output or otherwise represent multiple predictions based on the unlabeled data stream 160, such as respective predictions for multiple different portions, data points, files, or the like, included in or represented by the unlabeled data stream 160. In some such implementations, the computing device 102 may be configured to subdivide data streams into one or multiple portions based on factors such as receipt time, account numbers, source, data type, or the like. Additionally, the computing device 102 may initiate a process of labeling the unlabeled data stream 160. For example, the computing device 102 may initiate a second, more rigorous fraud analysis process using the unlabeled data stream 160, or the computing device 102 may provide the unlabeled data stream 160 to another device for automatic, manual, or a hybrid automatic and manual analysis to label the unlabeled data stream 160, as non-limiting examples, such that the labeled input data can be used for incremental retraining of CL classifiers or training of new non-CL classifiers.

The classification engine 124 may select one of the ML classifiers to receive the unlabeled data stream 160 based on the data drift of the unlabeled data stream 160. To illustrate, the data drift monitor 122 may determine (e.g., estimate) the data drift of the unlabeled data stream 160 with respect to the historical streamed data 114 (e.g., the training data used to train the first ML classifier 126), such as using ADWIN or another drift monitoring technique. If the data drift fails to satisfy (e.g., is less than or equal to, or is less than) the lower threshold 110, the classification engine 124 provides the unlabeled data stream 160 as input to the first ML classifier 126 to generate the classification output 162. For example, the first ML classifier 126 may generate predictions of labels that correspond to the unlabeled data received as the unlabeled data stream 160, and the predicted labels are output as the classification output 162. Alternatively, if the data drift satisfies (e.g., is greater than, or is greater than or equal to) the lower threshold 110, the classification engine 124 provides the unlabeled data stream 160 as input to the second ML classifier 128, instead of the first ML classifier 126, to generate the classification output 162 (e.g., the predicted labels for the unlabeled data stream 160). In this manner, the classification engine 124 provides the unlabeled data stream 160 as input to a single ML classifier at any given time, and any ML classifier that does not receive input is deactivated or otherwise unused to conserve computational resources and reduce power consumption incurred by the unselected ML classifier(s). Because the first ML classifier 126 is a non-CL classifier and the second ML classifier 128 is a CL classifier, the first ML classifier 126 may be less complex and thus require less computational and memory resources, and consume less power, when in use as compared to the second ML classifier 128. Accordingly, resource and power consumption considerations may favor using the first ML classifier 126 instead of the second ML classifier 128. However, performance (e.g., prediction accuracy) of the first ML classifier 126 may degrade if the input data drifts too far from the profile of the training data for the first ML classifier 126. Such a point in data drift may correspond to a learned threshold limit of the first ML classifier 126. For this reason, the lower threshold 110 may be set as the learned threshold limit of the first ML classifier 126, such that when the data drift determined by the data drift monitor 122 satisfies the lower threshold 110, the data drift has become significant to degrade performance of the first ML classifier 126 to the point that the extra computational and memory resource use, and increased power consumption, associated with use of the second ML classifier 128 may be justifiable in view of the improved performance (e.g., predication accuracy) of the second ML classifier 128 compared to the first ML classifier 126. Accordingly, if the data drift satisfies the lower threshold 110, the classification engine 124 adaptively changes to providing the unlabeled data stream 160 as input to the second ML classifier 128, instead of the first ML classifier 126, to prevent the performance degradation experienced by the first ML classifier 126 at this level of data drift.

The data drift monitor 122 may be configured to monitor the data drift, and to provide notifications of the data drift related to the threshold(s) to the classification engine 124, periodically, continually, or based on one or more trigger conditions. For example, the data drift monitor 122 may be configured to determine the data drift periodically, such as for a consistent window size (e.g., portion size) of the unlabeled data stream 160. As non-limiting examples, the data drift monitor 122 may be configured to determine the data drift for segments of streaming data having a particular size (e.g., data size), for windows having a particular duration (e.g., in seconds, minutes, hours, or the like), for segments including a particular number of members (e.g., files, messages, etc.), or the like. As another example, the data drift monitor 122 may be configured to monitor the data drift continually, or as continually as possible, and either provide continual notifications to the classification engine 124 or only provide notifications to the classification engine 124 when the data drift exceeds or falls below one of the one or more thresholds stored at the memory 106. As yet another example, the data drift monitor 122 may be configured to monitor the data drift based on one or more trigger conditions, such as a change in a streaming rate of the unlabeled data stream 160, an error count or other measurement based on the unlabeled data stream 160, a user specified condition, or any other type of trigger condition. If the data drift determined by the data drift monitor 122 does not change with respect to satisfying (or falling below) one or more thresholds, the classification engine 124 may continue providing the unlabeled data stream 160 to the selected ML classifier for generating the classification output 162.

However, if the data drift changes with respect to one or more thresholds at a current time (e.g., a current monitoring or determining time by the data drift monitor 122) as compared to the immediately previous time (e.g., after expiration of a time period initiated upon the previous data drift determination and providing of the unlabeled data stream 160 as input to the first ML classifier 126, or a trigger condition), then the classification engine 124 may dynamically determine to change which ML classifier is to receive the unlabeled data stream 160. To illustrate, if the data drift satisfies the lower threshold 110 and fails to satisfy the upper threshold 112 (e.g., the data drift is between the lower threshold 110 and the upper threshold 112), the classification engine 124 switches from providing the unlabeled data stream 160 as input to the first ML classifier 126 to providing the unlabeled data stream 160 as input to the second ML classifier 128 to generate the classification output 162. For example, the second ML classifier 128 may generate predictions of labels that correspond to the unlabeled data received as the unlabeled data stream 160, and the predicted labels are output as the classification output 162 (e.g., for a current window, portion, or other segment of the unlabeled data stream 160). In some implementations, the second ML classifier 128 may not be trained until selected for activation, or the second ML classifier 128 may undergo training during at least some of the operation of the first ML classifier 126. For example, if the first ML classifier 126 is selected to generate the classification output 162 for a first window, a second window, and a third window of the unlabeled data stream 160, it is possible that analysis of the data corresponding to the first window, and possibly the second window, is complete during receipt of the data corresponding to the third window. Upon completion of this analysis, the labels 116 (or a portion thereof) corresponding to the data of the first window, and possibly the second window, are obtained, and the second ML classifier 128 may be trained using training data based on the historical streamed data 114 and the received data and the labels 116 corresponding to the first window, or both the first and second windows, if available at the time of training. As such, if the second ML classifier 128 is selected to generate the classification output 162 for during a fourth window, the second ML classifier 128 may be trained based not only on historical data, but at least partially based on some of the data received during operation of the computing device 102, which may improve performance of the second ML classifier 128 if the data is already starting to noticeably drift during the first and second windows (or any time period for which received data is analyzed and labeled for use in training the second ML classifier 128).

This adaptive assigning of the unlabeled data stream 160 to ML classifiers occurs at each scheduled time (e.g., for each window or time period) or triggered condition. As an example, at a next determination time (e.g., for a next window of the unlabeled data stream 160 or other trigger condition), the classification engine 124 may receive a notification of the current data drift, or the relationship between the current data drift and one or more thresholds, from the data drift monitor 122 for use in determining selection of which ML classifier is to be used to generate the classification output 162. Although the example illustrated in FIG. 1 and described herein refers to selecting between two ML classifiers initially, in other implementations, there may be more than two ML classifiers and the selection may be based on the relationship of the data drift to more than two thresholds and/or based on other parameters. If the data drift falls below the lower threshold 110, the classification engine 124 switches from use of the second ML classifier 128 back to providing the unlabeled data stream 160 as input to the first ML classifier 126 for generating the classification output 162 for the next window, thereby reducing computational resource use and power consumption as compared to using the second ML classifier 128 for the next window. Alternatively, if the data drift remains between the lower threshold 110 and the upper threshold 112, the classification engine 124 continues providing the unlabeled data stream 160 as input to the second ML classifier 128 to generate the classification output 162 for the new window to avoid the anticipated performance degradations that would be experienced by the first ML classifier 126.

However, if the data drift satisfies (e.g., is greater than, or greater than or equal to) the upper threshold 112, the classification engine 124 determines that the data drift is substantial enough to cause performance degradation to both the first ML classifier 126 and the second ML classifier 128. For example, a withstand capacity associated with the second ML classifier 128 may be determined, such as based on offline experimentation and testing of similar CL classifiers, based on one or more parameters of the second ML classifier 128, based on one or more characteristics of the training data used to train the second ML classifier 128, other information, or a combination thereof, and the withstand capacity may indicate a particular amount or degree of data drift after which the performance of the second ML classifier 128 no longer satisfies one or more target metrics. The upper threshold 112 may be set to the value of the withstand capacity, such that if the data drift exceeds both the lower threshold 110 and the upper threshold 112, it is expected that the performance of both ML classifiers 126 and 128 will no longer satisfy one or more target metrics. In this situation, the classification engine 124 notifies the cluster engine 130 and the classifier training engine 134 to initiate training of new ML classifiers to compensate for the substantial data drift.

Responsive to receiving the notification (e.g., message, instruction, etc.) from the classification engine 124, the cluster engine 130 may perform clustering on a profile of the unlabeled data stream 160 for the current window (e.g., the next window after the previous current window, or stated another way, the window after expiration of a time period from the unlabeled data stream 160 was assigned to the second ML classifier 128) to segment the unlabeled data stream 160 into multiple profile clusters. To illustrate, the reason for data drift that is substantial enough to satisfy the upper threshold 112 may be that the streaming data has diverged to the point that multiple different profiles are represented by the current window of the streaming data, as compared to the original training data. As such, a single ML classifier is unlikely to perform well in classifying the streaming data at this point in time. In order to identify how many profiles are represented by the unlabeled data stream 160 in the current window, and to learn or identify the characteristics of those profiles, the cluster engine 130 performs one or more clustering operations on the current window of the unlabeled data stream 160 (e.g., samples during the current window) to segment the data into multiple profile clusters (e.g., the profile clusters 132). Each profile cluster of the profile clusters 132 may include samples that are most similar to other members of the same profile cluster than they are to members of other profile clusters, and thus taken together, the samples of each profile cluster may be used to identify or derive a data profile representative of the samples of that cluster. In some implementations, the cluster engine 130 performs affinity propagation clustering to segment the input data into the profile clusters 132, which beneficially does not require an initial number of clusters as an initial parameter. In other implementations, the clustering operations may be performed in accordance with a different clustering algorithm, such as K-Means, K-Modes, or the like.

After the cluster engine 130 has clustered the data into the profile clusters 132, the classifier training engine 134 trains the multiple new ML classifiers 136 based on the profile clusters 132. To illustrate, each individual profile cluster of the profile clusters 132 may be used to generate training data to train a corresponding ML classifier of the new ML classifiers 136. As a non-limiting example, after the cluster engine 130 performs clustering on the current window of the unlabeled data stream 160, the profile clusters 132 may include three profile clusters: a first profile cluster, a second profile cluster, and a third profile cluster. In this example, the multiple new ML classifiers 136 includes three new ML classifiers: a first new ML classifier trained based on the first profile cluster, a second new ML classifier trained based on the second profile cluster, and a third ML classifier trained based on the third profile cluster. Each of the multiple new ML classifiers 136 are trained to perform classification without using continuous learning (e.g., the multiple new ML classifiers 136 are non-CL classifiers), such that each of the multiple new ML classifiers 136 are of similar complexity and have similar computational and memory resource requirements and power consumption profiles as the first ML classifier 126, which is less than those of the second ML classifier 128. Once the multiple new ML classifiers 136 have been trained they are put into service by the classification engine 124 for possible selection for generation of the classification output 162. In some implementations, training and putting into service the multiple new ML classifiers 136 is relatively fast due to the lower complexity of the ML classifiers, and can occur during a same window as classification is needed. Alternatively, if training and putting into service the multiple new ML classifiers 136 is expected to take the duration of one or more windows, the upper threshold 112 may be set to the difference between the withstand capacity of the second ML classifier 128 and the expected duration of the training and putting into service, instead of being set equal to the withstand capacity, such that the training can occur during a window in which the second ML classifier is in use and thus there is not a gap in generation of the classification output 162.

In some implementations, to select the ML classifier to perform classification on the current window of the unlabeled data stream 160 (and for future windows going forward), the classification engine 124 samples the data of the unlabeled data stream 160 and determines which of the multiple new ML classifiers 136 to select based on a relationship between the sampled data and the profile clusters used to train the multiple new ML classifiers 136. To illustrate, the classification engine 124 samples the current window of the unlabeled data stream 160, or a portion of the data from the current window to be classified, to generate the samples 118 (or a portion thereof), and the classification engine 124 compares the samples 118 to the profile clusters 132 to determine distances between the samples 118 and centroids of the profile clusters 132. In some implementations, the distances determined by the classification engine 124 are Euclidean distances. In other implementations, the distances are other types of distances or similarity metrics for comparing single or multidimensional values. For each of the samples 118 (or portions of the samples 118 corresponding to each window), the classification engine 124 identifies a closest profile cluster of the profile clusters 132 to the sample as the profile cluster corresponding to the shortest (e.g., smallest or least) determined distance, and the classification engine 124 provides the portion of the unlabeled data stream 160 corresponding to the sample (or the window corresponding to the samples 118) to the one of the new ML classifiers 136 that corresponds to the identified closest profile cluster to generate the classification output 162 for that portion of the unlabeled data stream 160. The unlabeled data stream 160 may be sampled on a window level, such that the portion of the samples 118 generated based on a particular window result in assigning the unlabeled data stream 160 to one of the multiple new ML classifiers 136 for an entirety of the window, or the unlabeled data stream 160 may be sampled for smaller granularities than a window, such that different portions of the unlabeled data stream 160 for a single window can be assigned to different ones of the multiple new ML classifiers 136. In the above-described illustrative example in which the profile clusters 132 include three profile clusters and the multiple new ML classifiers 136 include three ML classifiers, the classification engine 124 determines a distance (e.g., Euclidean distance) between a first sample (or a first portion) of the samples 118 and a centroid of the first profile cluster, a distance between the first sample and a centroid the second profile cluster, and a distance between the first sample and a centroid of the third profile cluster, and the classification engine 124 identifies the closest profile cluster as the profile cluster associated with the shortest of the three determined distances. To further illustrate, if the distance between the first sample and the centroid of the first profile cluster is shorter than the other two determined distances, the first profile cluster is identified the closest profile cluster, and the portion of the unlabeled data stream 160 that corresponds to the first sample (or the first portion of samples) is assigned as input to the first new ML classifier of the multiple new ML classifiers 136 to generate the classification output 162 for that portion of the unlabeled data stream 160. As another illustrative example, if a distance between a second sample (or a second portion) of the samples 118 and the centroid of the third cluster profile is shorter than distances between the second sample and the centroids of the other two cluster profiles, a portion of the unlabeled data stream 160 that corresponds to the second sample is assigned as input to the third new ML classifier of the multiple new ML classifiers 136 to generate the classification output 162 for that portion of the unlabeled data stream 160. In some other implementations, the classification engine 124 does not sample incoming data to determine which of the multiple new ML classifiers 136 to assign the unlabeled data stream 160 to, instead the classification engine 124 assigns the unlabeled data stream 160 as input to all of the multiple new ML classifiers 136, and an aggregated output is provided as the classification output 162. The aggregated output may include an average, a weighted average, a result of a voting function, or another type of aggregation of the outputs of the multiple new ML classifiers 136.

Classification of additional windows of the unlabeled data stream 160 continue in a similar manner to as described above. To illustrate, a new lower threshold may be set as the learned limit threshold of one or more of the multiple new ML classifiers 136, and as long as the data drift fails to satisfy the new lower threshold, one or more of the multiple new ML classifiers 136 may be used to generate the classification output 162. If the data drift satisfies the new lower threshold, one or more new CL classifiers, similar to the second ML classifier 128, may be trained and put into service based on the profile clusters 132, such that a new CL classifier may be used to perform classification on the unlabeled data stream 160 if the data drift is between the new lower threshold and a new upper threshold corresponding to a withstand capacity of one or more of the new CL classifiers. In some such implementations, the new CL classifiers are trained at the same time as the multiple new ML classifiers 136 such that they are put into service and ready for use if the data drifts above the new lower threshold. Alternatively, the new CL classifiers can be trained or put into service on an individual basis, such that when the data drift exceeds the new lower threshold, only a CL classifier that corresponds to the nearest cluster profile is trained and/or put into service. Similar to as described above, if the data drift exceeds the new upper threshold, the classification engine 124 initiates performance of clustering and training of additional new ML classifiers by the cluster engine 130 and the classifier training engine 134, respectively. Based on research into typical data drift and use cases for streaming data classification, it is predicted that one to three iterations of training initial ML classifiers through the clustering and training of new ML classifiers will account for expected data drift in the vast majority of use cases, such that the systems and techniques described herein are scalable and not subject to ever-increasing computational resource use and power consumption.

In a particular implementation, a system for adaptive machine learning classification that mitigates effects of catastrophic forgetting is disclosed. The system includes a memory (e.g., 106) and one or more processors (e.g., 104) communicatively coupled to the memory. The one or more processors are configured to receive an unlabeled data stream (e.g., 160). The one or more processors are also configured to provide the unlabeled data stream as input to a first ML classifier (e.g., 126) to generate classification output (e.g., 162). The first ML classifier is trained based on historical streamed data (e.g., 114) to perform classification without using continuous learning. The one or more processors are configured to determine whether data drift of the unlabeled data stream satisfies a lower threshold (e.g., 110). The one or more processors are further configured to, based on the data drift satisfying the lower threshold, provide the unlabeled data stream as input to a second ML classifier (e.g., 128) instead of the first ML classifier to generate the classification output. The second ML classifier is trained to perform classification using continuous learning.

As described above, the system 100 supports adaptive ML classification that mitigates the effects of catastrophic forgetting and that efficiently use computational and memory resources to enable improved classification performance through use of continuous learning at a wider array of devices that do not meet the more stringent resource requirements and power needs of conventional continuous learning-based classifiers. For example, the system 100 uses both the first ML classifier 126 (e.g., a less complex, non-CL classifier) and the second ML classifier 128 (e.g., a more complex, CL classifier), including switching between use of the two ML classifiers based on data drift determined by the data drift monitor 122, to provide classification services in a streaming data context that mitigate the effects of catastrophic forgetting in a resource-efficient and scalable manner. Some implementations of continuous learning ML classifiers, such as the second ML classifier 128 and CL classifiers described below with reference to FIG. 2, add penalties to loss functions used in the continuous learning to improve performance on previous tasks (e.g., reduce catastrophic forgetting) without becoming computationally burdensome to the point that use of the loss function is not scalable above a few tasks, such as two, three, or four total tasks. Additionally, the data drift monitor 122 identifies data drift that is significant enough to degrade performance of the first ML classifier 126, resulting in switching to use of the more resource intensive second ML classifier 128 only in situations in which the performance of the first ML classifier 126 is no longer sufficient to satisfy one or more target metrics. Accordingly, computational resource use and power consumption are reduced as compared to conventional CL classifiers until performance metrics are no longer met. Similarly, the data drift monitor 122 identifies data drift that is significant enough to degrade performance of the second ML classifier 128, and in such situations the cluster engine 130 performs clustering on the unlabeled data stream 160 to identify the profile clusters 132 (e.g., multiple different data profiles represented by the unlabeled data stream 160) for use in training the multiple new ML classifiers 136 by the classifier training engine 134 in situations when performance of the initial ML classifiers no longer satisfies target metrics. As such, the dynamic and adaptive ML classification supported by the system 100 provides more accurate classification results for high volume streaming data while balancing the competing goals of mitigating the effects of catastrophic forgetting and reducing resource use and power consumption, resulting in the system 100 being scalable to larger number of tasks. Accordingly, the system 100 provides significant performance, complexity/scalability, and cost improvements over both conventional static ML classifiers and conventional continuous learning ML classifiers.

Figure 2:
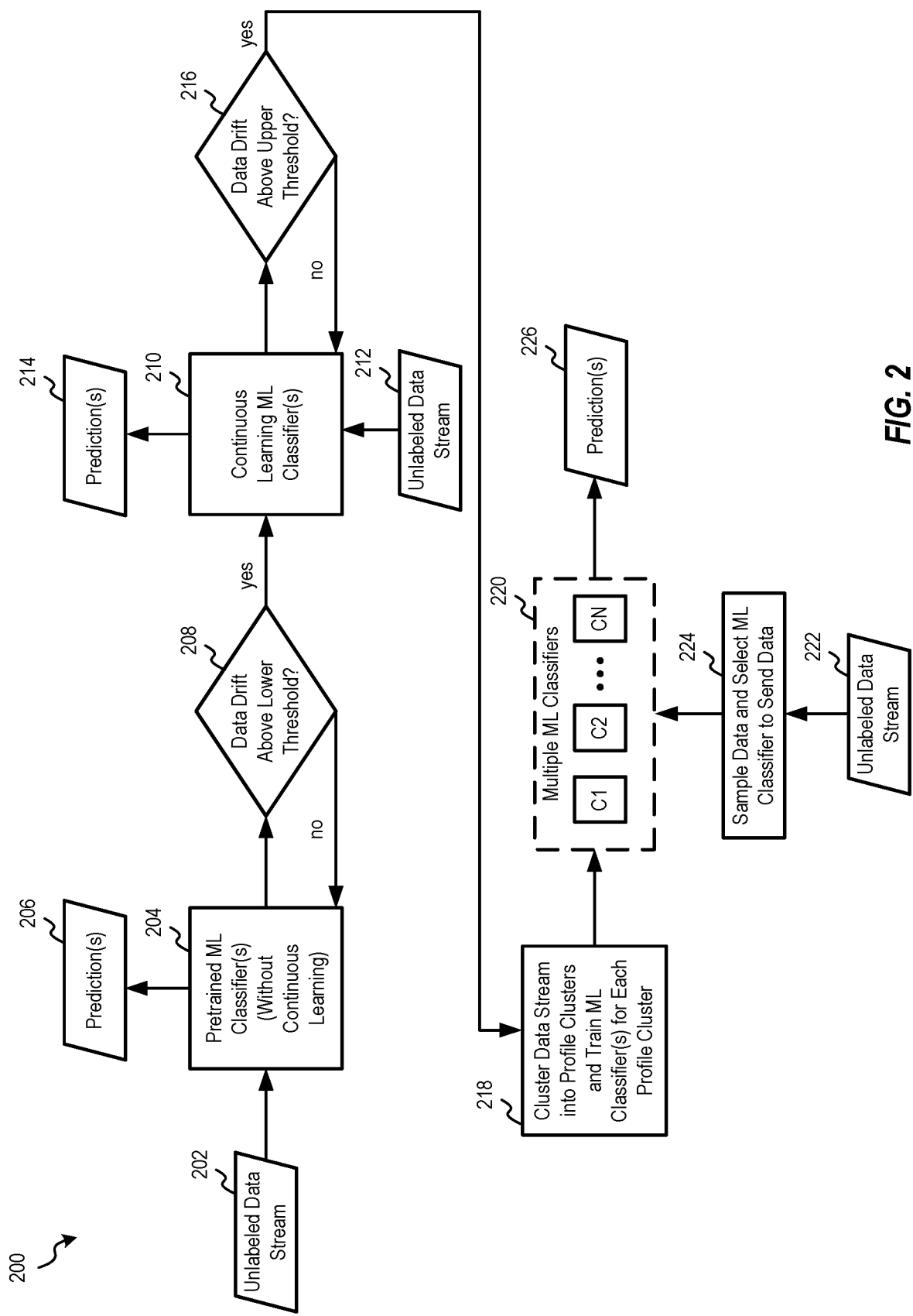
FIG. 2 is a process flow diagram illustrating an example of a process flow for dynamically performing classification on an unlabeled data stream using multiple types of machine learning (ML) classifiers according to one or more aspects.

Referring to FIG. 2, an example of a process flow for dynamically performing classification on an unlabeled data stream using multiple types of ML classifiers according to one or more aspects is shown as a process flow 200. The process flow 200 may be performed by one or more computing devices, such as server(s), cloud-based system(s), networked device(s), or the like, to provide improved ML classification services leveraging continued learning while mitigating the effects of catastrophic forgetting and that are scalable with respect to computational and memory requirements and power consumption. In some implementations, the process flow 200 may be performed by the system 100 of FIG. 1 (or components thereof).

The process flow 200 provides dynamic assignment of unlabeled data streams to ML classifiers in order to provide classification output (e.g., predictions) while improving (e.g., optimizing) performance and resource use as compared to conventional non-continuous learning and continuous learning classification systems. To illustrate, an unlabeled data stream 202 is provided as input to a pretrained ML classifier 204 upon initialization of the process flow 200. The pretrained ML classifier 204 is trained to perform classification without using continuous learning. In some implementations, the pretrained ML classifier 204 may include or correspond to the first ML classifier 126 of FIG. 1. Performing classification on the unlabeled data stream 202 causes the pretrained ML classifier 204 to generate predictions 206. The predictions 206 indicate a predicted label for each member of the input data, such as a prediction of whether a transaction is valid or fraudulent or a prediction of whether a network measurement is indicative of a fault, as illustrative examples. The unlabeled data stream 202 may be classified in portions (e.g., windows), with the predictions 206 generated for each corresponding window.

Prior to classifying another window of the unlabeled data stream 202, a determination 208 is performed to determine whether data drift associated with data to be input is above (e.g., satisfies) a lower threshold. For example, the lower threshold may be a learned threshold limit of the pretrained ML classifier 204, and the data drift may be estimated (e.g., determined) by comparing a profile of training data for the pretrained ML classifier 204 and a profile of the incoming data stream using an ADWIN technique, as a non-limiting example. If the data drift is not above the lower threshold, another window of the unlabeled data stream 202 is provided as input to the pretrained ML classifier 204 to generate the predictions 206, and upon completion the determination 208 is performed for the next window of incoming streaming data.

However, if the data drift is above the lower threshold, dynamic switching of ML classifiers occurs. To illustrate, an unlabeled data stream 212 is provided as input to a continuous learning ML classifier 210, instead of to the pretrained ML classifier 204, to generate predictions 214. The continuous learning ML classifier 210 is trained to perform classification using continuous learning. In some implementations, the continuous learning ML classifier 210 may include or correspond to the second ML classifier 128 of FIG. 1. The pretrained ML classifier 204 and the continuous learning ML classifier 210 may be trained based on the same training data, such as historical streamed data. In some implementations, the continuous learning ML classifier 210 is also trained based on data that is received and classified by the pretrained ML classifier 204 if labels are generated in time to be used for training, such as by a manual, automatic, or hybrid analysis of the received data. Performing classification on the unlabeled data stream 212 causes the continuous learning ML classifier 210 to generate the predictions 214, similar to generation of the predictions 206 by the pretrained ML classifier 204. Although unlabeled data streams 202 and 212 are labeled differently in FIG. 2, this is not intended to indicate that these are different data streams. Instead, the difference in naming and reference number is to convey different windows (e.g., portions) of a data stream received at different times, particularly the unlabeled data stream 212 being received after an amount of time in which the unlabeled data stream 202 has experienced sufficient data drift to exceed the lower threshold.

Prior to classifying another window of the unlabeled data stream 212, if the data drift decreases and falls below the lower threshold as in the determination 208, the incoming streaming data may be switched back from the continuous learning ML classifier 210 to the pretrained ML classifier 204 in order to reduce computational resource use and power consumption. However, if not, a determination 216 is performed to determine whether the data drift is above (e.g., satisfies) an upper threshold. For example, the upper threshold may be withstand capacity of the continuous learning ML classifier 210. If the data drift is not above the upper threshold (e.g., if the data drift is between the lower threshold and the upper threshold), another window of the unlabeled data stream 212 is provided as input to the continuous learning ML classifier 210 to generate the predictions 214, and upon completion the determinations 208 and 216 are performed for the next window of incoming streaming data.

However, if the data drift is above the upper threshold, dynamic instantiation and training of new ML classifiers occurs. To illustrate, clustering 218 is performed on the unlabeled data stream 212 in order to assign samples of the streaming data into multiple clusters that correspond to multiple different data profiles represented in the incoming streaming data and likely cause the data drift to exceed the upper threshold. In some implementations, the clustering 218 is affinity propagation clustering. Alternatively, other types of clustering algorithms may be used to perform the clustering 218. Upon generation of multiple clusters, the samples included in each cluster are used as training data to train a corresponding new ML classifier of multiple ML classifiers 220 to perform classification without using continuous learning. For example, if performance of the clustering 218 results in generation of N clusters, samples included in a first cluster are used as training data for a first ML classifier ("C1") of the multiple ML classifiers 220, samples included in a second cluster are used as training data for a second ML classifier ("C2") of the multiple ML classifiers 220, and samples included in an Nth cluster are used as training data for an Nth ML classifier ("CN") of the multiple ML classifiers 220.

Once the multiple ML classifiers 220 are trained and put into service, incoming data is sampled and one of the multiple ML classifiers 220 is selected to receive the incoming data based on the similarity of the incoming data to the various data profiles used to train the multiple ML classifiers 220. To illustrate, a window of an unlabeled data stream 222 undergoes sampling and distance measuring 224 to determine distances (e.g., Euclidean distances) between the sampled data and the centroids of the clusters generated by the clustering. The unlabeled data stream 222 is provided as input to the ML classifier of the multiple ML classifiers 220 that corresponds to the closest data profile to the samples (e.g., the data profile having the shortest distance to the samples), as this ML classifier is trained to have the best performance in classifying data having this profile. Because the input data is streaming data, it is likely that the input profile at other times will not be closest to the same ML classifier's data profile, so the sampling and distance measuring 224 is performed continuously (e.g., for each window, for each portion or other segment size, sampling rate, or the like) such that if sampled data is closer to a data profile cluster corresponding to a different ML classifier, the unlabeled data stream 222 is dynamically switched to being provided as input to the ML classifier that corresponds to this newly identified closest data profile. Providing the unlabeled data stream 222 as input to the multiple ML classifiers 220 causes generation of predictions 226 for one or more windows of the unlabeled data stream 222. Although not shown in FIG. 2, additional continuous learning ML classifiers can be trained based on the results of the clustering 218 and put into service, such that if the unlabeled data stream 222 experiences sufficient (e.g., more than a new lower threshold) data drift, the input streaming data may be switched from a non-continuous learning ML classifier to a continuous learning ML classifier, similar to as described with reference to the pretrained ML classifier 204 and the continuous learning ML classifier 210.

In some implementations, the continuous learning trained for use by the ML classifiers may be based on one or more loss functions in order to improve performance of the ML classifiers. For example, the continuous learning ML classifier 210 may be trained using any of the loss functions and techniques described in further detail below. Non-limiting examples of these techniques include Elastic Weight Consolidation (EWC) and Online Elastic Weight Consolidation (OEWC).

Neural Networks are over-parameterized which makes them suitable for continual learning. There are multiple solutions for the same task which makes it easier to find a common solution for two or more tasks that will do reasonably well on all the tasks. Hence, in EWC, while learning a second task ("task 2"), a penalty is added to ensure that new best parameters for task 2, $\theta^*_2$ (* specifies best parameters after last epoch) will stay close to previously found best parameters for a first task ("task 1"), $\theta^*_1$. Equation 1 below is a generalized loss function for EWC.

$$\mathcal{L}(\theta) = \mathcal{L}_N(\theta) + \sum_i \frac{\lambda}{2} F_{1,i}(\theta_i - \theta^*_{1,i})^2 + \quad \text{Equation 1-EWC Loss Function}$$
$$\ldots\ldots + \sum_i \frac{\lambda}{2} F_{n-1,i}(\theta_i - \theta^*_{n-1,i})^2$$

$\lambda$ is a hyperparameter and determines how well the classifier performs on older tasks. For example, setting λ too high will not let newer tasks be learned well, as model parameters will deviate less from task 1 parameters while learning task 2 parameters with this setting. F is the Fisher information matrix and indicates the relevance of neural network parameters for older tasks.

When moving to a third task ("task 3"), EWC will try to keep neural network parameters close to learned parameters of both task 1 and task 2. It is to be noted that EWC has linear space and computational complexity in the number of tasks, as more tasks will be introduced sequentially, and the Fisher information and best parameters for each task will be kept. Penalty terms will also keep on growing and learning on the current task will be over-constrained, resulting in poor performance on the newer tasks.

EWC is resilient against catastrophic forgetting, but it suffers in positive forward transfer as more tasks are added sequentially. From the third task onward, the objective in Equation 1 is inconsistent with Bayesian inference. $\theta^*_2$ was obtained while incorporating the penalty around $\theta^*_1$, once is obtained $\theta^*_2$, $\theta^*_1$ is not needed anymore. OEWC addressed this issue by proposing a different penalty, as shown in the loss function given in Equation 2 below.

$$\mathcal{L}(\theta) = \quad \text{Equation 2-OEWC Loss Function}$$
$$\mathcal{L}_N(\theta) + \sum_i \frac{\lambda}{2} F^*_{n-1,i}(\theta_i - \theta^*_{n-1,i})^2$$

A difference in Equation 1 when compared with Equation 2 is that Gaussian approximation of previous task likelihoods are "re-centered" at the latest MAP parameters. This reduces computational complexity and accelerates learning on the current task. The overall Fisher information $F^*_n$ (Accumulation of all previous Fisher information) and latest parameters $\theta^*_n$ will only be needed to compute the objective when visiting the $(n+1)^{th}$ task. The overall Fisher information is calculated by the formula given in Equation 3 below.

$$F^*_n = \gamma F^*_{n-1} + F_n \quad \text{Equation 3—OEWC Fisher Information}$$

The hyperparameter $\gamma<1$ is selected to ensure that learning accelerates on the current task. However, re-centering to the latest MAP parameters results in previous tasks being less remembered then the current task.

When more tasks are added, sequentially learning on newer tasks becomes over-constrained, which degrades the performance of the EWC algorithm on new tasks. The OEWC algorithm reduces the penalty and keeps only one penalty which minimizes the difference between the latest MAP parameters and new task parameters. OEWC has only one overall Fisher information matrix, hence spatial complexity is constant as previous Fisher information matrices are not retained. However, despite its simplicity, OEWC degrades performance on the previous tasks, and thus both EWC and OEWC provide improved performance over conventional non-continuous learning, but also have opportunities for improvement.

To address these issues with EWC and OEWC, in some implementations a different loss function is used to train the continuous learning ML classifiers described herein. This objective function may be referred to as "Robust EWC" (REWC). A goal of REWC is to add an additional penalty term as compared to OEWC. The additional penalty term acts as an extra measure against catastrophic forgetting, reducing the likelihood that learning on a newer task is over-constrained at the same time. This trade-off not only may improve learning on older and newer tasks, but also may improve overall average accuracy increasing the performance of neural network classifiers. Equation 4 below gives the loss function for REWC.

$$\mathcal{L}(\theta) = \quad \text{Equation 4-REWC Loss Function}$$
$$\mathcal{L}_N(\theta) + \sum_i \frac{\lambda}{2} F^*_{n-1,i}(\theta_i - \theta^*_{n-1,i})^2 +$$
$$\sum_i \frac{\lambda}{2} F_{n-1,i} |\theta_i - \theta^*_{n-1,i}|$$

In Equation 4 above, θ is an input configuration of neural networks parameters, θ* is a target configuration of neural network parameters, n is a total number of tasks, Σ is data, λ is a hyperparameter corresponding to success on older tasks, and F is a Fisher information matrix, similar to EWC and OEWC.

Figure 3:
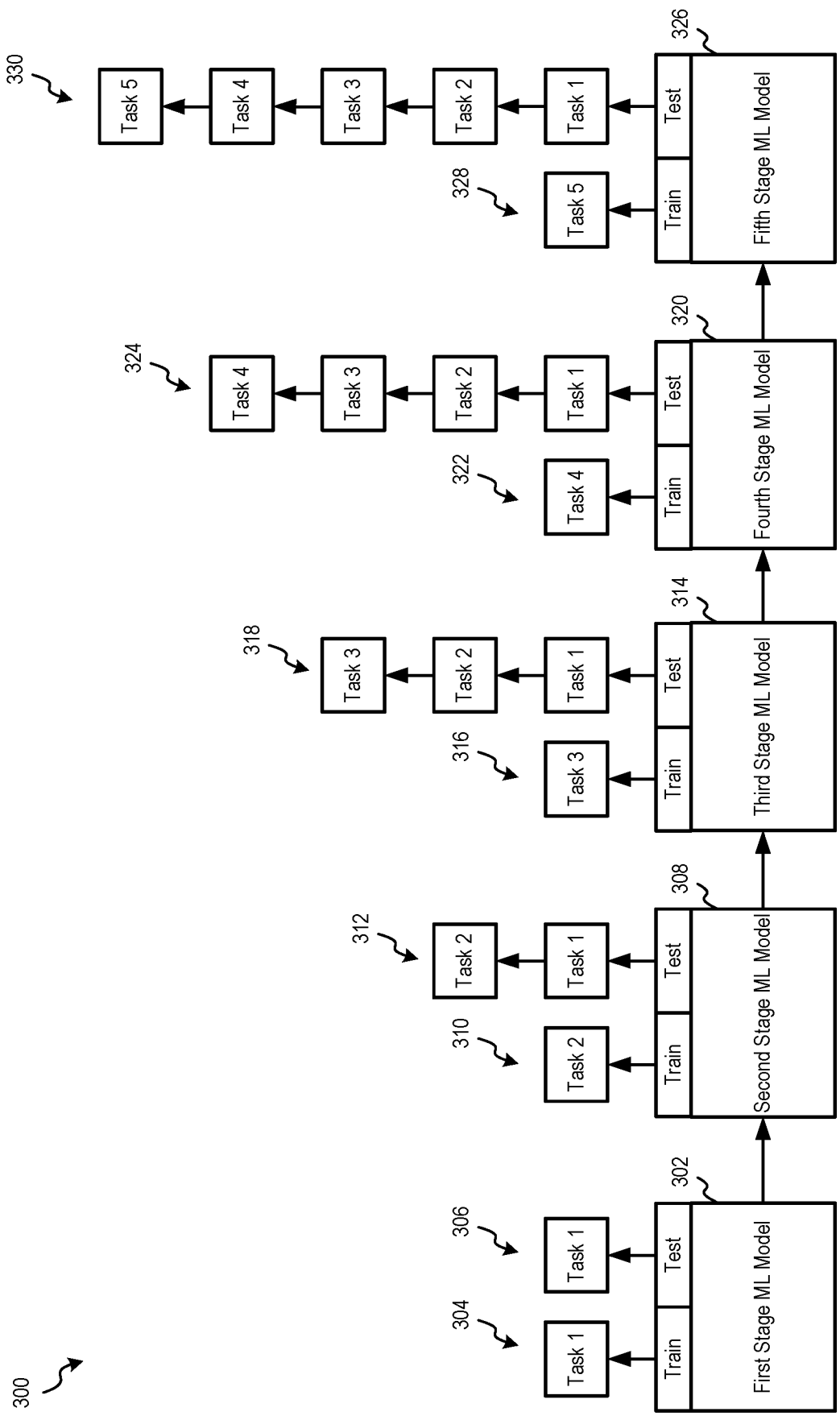
FIG. 3 is a block diagram of an example of an ML classifier that leverages continuous learning according to one or more aspects.

Referring to FIG. 3, an example of an ML classifier that leverages continuous learning according to one or more aspects is shown as an ML classifier 300. In some implementations, the ML classifier 300 may include or correspond to one or more continuous learning ML classifiers described herein, such as the second ML classifier 128 of FIG. 1 or the continuous learning ML classifier 210 of FIG. 2.

As part of continuous learning, an ML classifier is incrementally trained to perform additional tasks as time progresses, thus enabling the ML classifier to learn from changes in a dataset beyond initial training data. In the example illustrated in FIG. 3, the ML classifier 300 is trained in five stages to learn to perform five classification tasks (e.g., learning classification based on five different sets of training data, such that parameter values learned from one stage may not be the same as parameter values learned from a different stage). However, previously learned tasks are expected to be retained such that they may be tested or performed at a later stage. To illustrate, during a first stage, a first stage ML model 302 is trained to perform a first task 304 ("Task 1") and is tested to perform a first set of tasks 306. Because only one task has been trained in the first stage, the first set of tasks 306 includes only the first task 304. During a second stage, a second stage ML model 308 is trained to perform a second task 310 ("Task 2") and is tested to perform a second set of tasks 312 that includes the first task 304 and the second task 310. During a third stage, a third stage ML model 314 is trained to perform a third task 316 ("Task 3") and is tested to perform a third set of tasks 318 that includes the first task 304, the second task 310, and the third task 316. During a fourth stage, a fourth stage ML model 320 is trained to perform a fourth task 322 ("Task 4") and is tested to perform a fourth set of tasks 324 that includes the first task 304, the second task 310, the third task 316, and the fourth task 322. During a fifth stage, a fifth stage ML model 326 is trained to perform a fifth task 328 ("Task 5") and is tested to perform a fifth set of tasks 330 that includes the first task 304, the second task 310, the third task 316, the fourth task 322, and the fifth task 328. As described above with reference to FIG. 2, the ML classifier 300 may be trained using one or more loss functions or other techniques to reduce or mitigate the effects of catastrophic forgetting. For example, the likelihood of the fourth stage ML model 320 forgets how to perform the second task 310 may be reduced via use of a particular loss function during training, as a non-limiting example. As such, the ML classifier 300 may have improved performance as compared to conventional non-continuous learning classifiers, as expected by virtue of continuous learning, but also as compared to conventional continuous learning-based classifiers.

Figure 4:
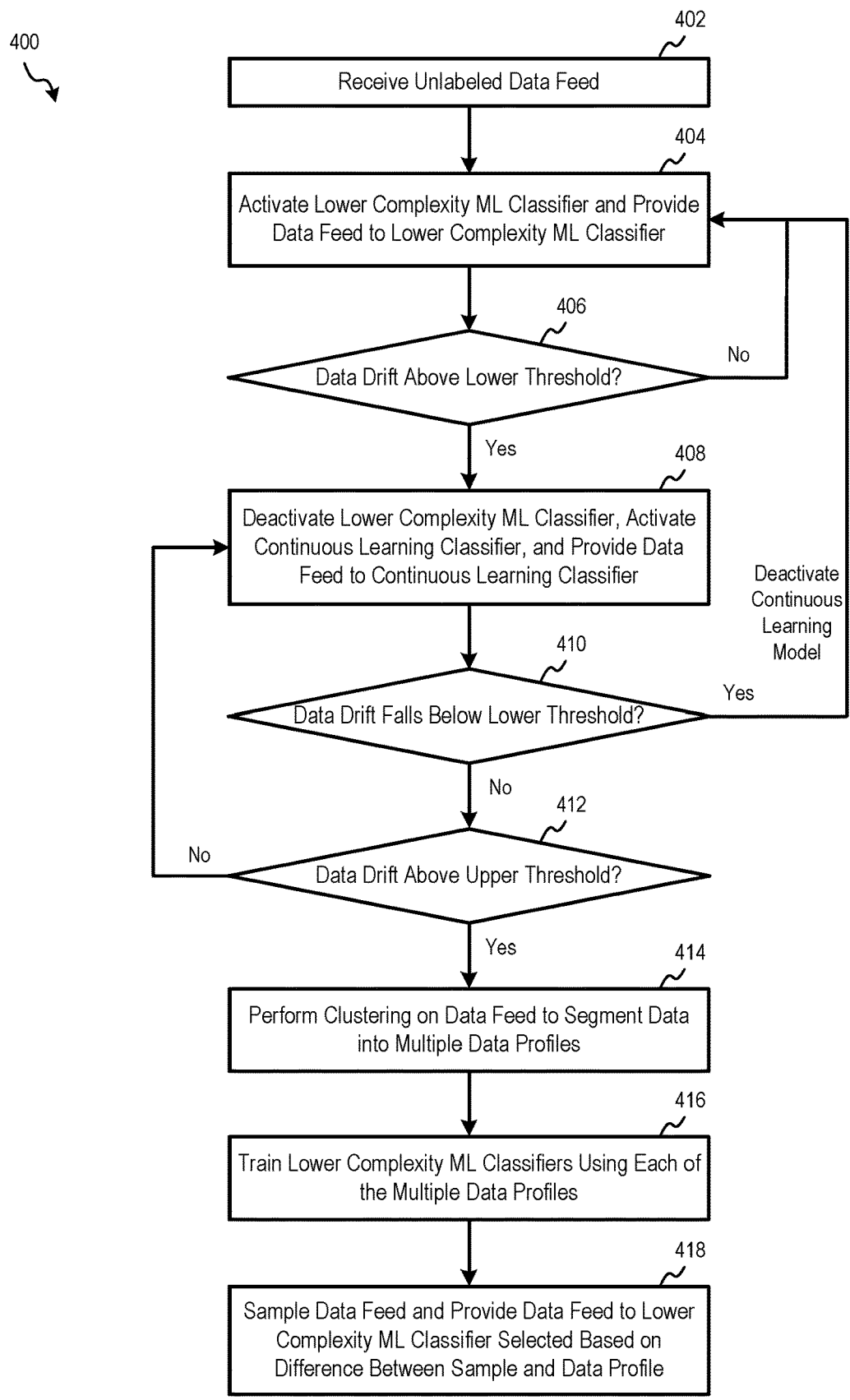
FIG. 4 is a flow diagram illustrating an example of a method for adaptively assigning an unlabeled data feed to ML classifiers according to one or more aspects.

Referring to FIG. 4, a flow diagram of an example of a method for adaptively assigning an unlabeled data feed to ML classifiers according to one or more aspects is shown as a method 400. In some implementations, the operations of the method 400 may be stored as instructions that, when executed by one or more processors (e.g., the one or more processors of a computing device or a server), cause the one or more processors to perform the operations of the method 400. In some implementations, these instructions may be stored on a non-transitory computer-readable storage medium. In some implementations, the method 400 may be performed by a computing device, such as the computing device 102 of FIG. 1, device(s) that perform the process flow 200 of FIG. 2, or a combination thereof.

The method 400 includes receiving an unlabeled data feed (e.g., one or more data stream), at 402. The unlabeled data feed may be any type of streaming or high volume data provided for the performance of classification services. As a non-limiting example, the unlabeled data feed may represent multiple transactions by customers of a credit card company, and the classification (e.g., prediction) services may be configured to predict whether the transactions are approved or fraudulent. The method 400 includes activating a lower complexity ML classifier and providing the data feed as input to the lower complexity ML classifier, at 404. For example, the unlabeled data feed may be handled for classification in portions (e.g., windows), and a window of the unlabeled data stream may be provided as input to the lower complexity ML classifier to cause the lower complexity ML classifier to output classification output (e.g., predictions) for the window of the unlabeled data feed. The lower complexity ML classifier is less complex, and therefore is associated with less stringent resource requirements and consumes less power, than continuous learning ML classifiers that may also be used during performance of the method 400. For example, the lower complexity ML classifier may include or correspond to the first ML classifier 126 of FIG. 1 or the pretrained ML classifier 204 of FIG. 2.

The method 400 includes determining whether a data drift associated with the unlabeled data feed is above (e.g., satisfies) a lower threshold, at 406. For example, the data drift between a profile corresponding to a current window of the unlabeled data feed and a profile corresponding to training data used to train the lower complexity ML classifier may be compared to determine the data drift for the current window, such as using an ADWIN technique, as a non-limiting example. If the data drift is less than or equal to (or is less than) the lower threshold, the method 400 returns to 404 and another window of the unlabeled data feed is provided as input to the lower complexity ML classifier for classifying. If the data drift is greater than (or is greater than or equal to) the lower threshold, the method 400 continues to 408.

The method 400 includes deactivating the lower complexity ML classifier, activating a continuous learning (CL) classifier, and providing the unlabeled data feed as input to the CL classifier, at 408. For example, a current (e.g., next unclassified) window of the unlabeled data stream may be provided as input to the CL classifier to cause the CL classifier to output classification output (e.g., predictions) for the current window of the unlabeled data feed. The CL classifier is more complex, and therefore is associated with more stringent resource requirements and consumes more power, than the less complex ML classifier. However, the CL classifier is configured to perform better in some situations in which the data drift degrades performance of the less complex ML classifier. For example, the CL classifier may include or correspond to the second ML classifier 128 of FIG. 1 or the continuous learning ML classifier 210 of FIG. 2.

The method 400 includes determining whether the data drift associated with the unlabeled data feed falls below the lower threshold, at 410. If the data drift is less than or equal to (or is less than) the lower threshold, the method 400 returns to 404, the CL classifier is deactivated (e.g., put into a sleep or unused condition), and another window of the unlabeled data feed is provided as input to the lower complexity ML classifier for classifying. If the data drift does not fall below the lower threshold, the method 400 continues to 412, and it is determined whether the data drift is above an upper threshold. If the data drift is not greater than (or greater than or equal to) the upper threshold, such that the data drift remains between the lower threshold and the upper threshold, the method 400 returns to 408, and another window of the unlabeled data feed is provided as input to the CL classifier for classifying. If the data drift is greater than (or is greater than or equal to) the upper threshold, the method 400 continues to 414.

The method 400 includes performing clustering on the unlabeled data feed to segment a current window of the unlabeled data feed into multiple data profiles, at 414. For example, clustering, such as affinity propagation clustering as an illustrative example, may be performed to assign data samples into different clusters based on their underlying similarities and differences, and each cluster represents one of multiple different profiles represented by the unlabeled data feed during the current window. The method 400 includes training lower complexity ML classifiers using each of the multiple data profiles, at 416. For example, the samples included in a cluster, and optionally additional data such as historical data or previously classified and labeled data, may be used as training data to train a lower complexity ML classifier, and a corresponding lower complexity ML classifier may be trained in this manner for each of the clusters. It will be appreciated that the number of clusters, and thus the number of lower complexity ML classifiers that are trained, is variable and depends on the distribution of the unlabeled data feed at the time the clustering is performed. Since these newly trained ML classifiers are lower complexity ML classifiers, they are trained to perform classification without using continuous learning. Once all the lower complexity ML classifiers are trained, they are put into service to provide classification outputs when input data is received.

The method 400 includes sampling the unlabeled data feed and providing the unlabeled data feed to one of the lower complexity ML classifiers that is selected based on differences between the samples and the data profiles corresponding to the newly trained lower complexity ML classifiers, at 418. To illustrate, the current window of the data may be sampled, and the samples may be compared to centroids of each of the data profile clusters created during the clustering to determine a respective distance, such as a Euclidean distance, between the samples and each cluster's centroid. The data profile cluster having the centroid that is the shortest distance (e.g., the lowest or least distance value) from the samples is identified as the closest data profile, and the unlabeled data feed is provided as input to the lower complexity ML classifier that corresponds to the closest data profile (e.g., the lower complexity ML classifier that was trained based on the identified closest data profile). The unlabeled data feed may be switched to other lower complexity ML classifiers when the samples are closer to a different data profile cluster, using a granularity of one or more samples, windows, or any other granularity. In some implementations, additional CL classifiers may be trained based on the data profile clusters, and new lower thresholds and upper thresholds established based on the additional less complex ML classifiers and the additional CL classifiers. As described above, when the data drift exceeds the new lower threshold, the unlabeled data feed may be switched from a less complex ML classifier to a corresponding CL classifier. Similarly, if the data drift exceeds the new upper threshold, the operations described with reference to 414-418 may be performed again to generate additional ML classifiers to account for the increased data drift.

Figure 5:
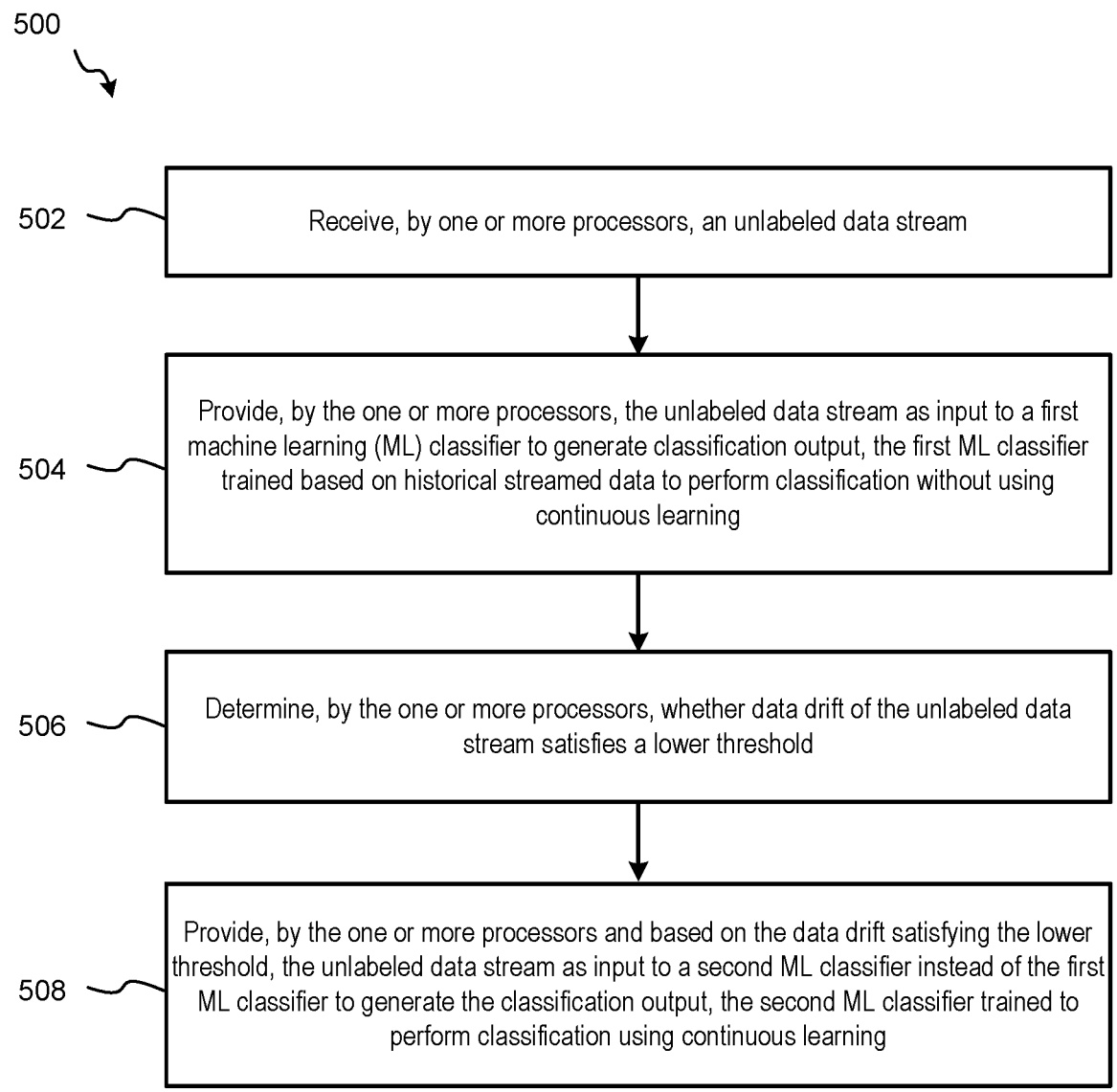
FIG. 5 is a flow diagram illustrating an example of a method for adaptive machine learning classification that mitigates effects of catastrophic forgetting according to one or more aspects.

Referring to FIG. 5, a flow diagram of an example of a method for adaptive machine learning classification that mitigates effects of catastrophic forgetting according to one or more aspects is shown as a method 500. In some implementations, the operations of the method 500 may be stored as instructions that, when executed by one or more processors (e.g., the one or more processors of a computing device or a server), cause the one or more processors to perform the operations of the method 500. In some implementations, these instructions may be stored on a non-transitory computer-readable storage medium. In some implementations, the method 500 may be performed by a computing device, such as the computing device 102 of FIG. 1 (e.g., a device configured for adaptively leveraging multiple types of ML models to mitigate the effects of catastrophic forgetting while reducing computational resource use), device(s) that perform the process flow 200 of FIG. 2, or a combination thereof.

The method 500 includes receiving an unlabeled data stream, at 502. For example, the unlabeled data stream may include or correspond to the unlabeled data stream 160 of FIG. 1. The method 500 includes providing the unlabeled data stream as input to a first ML classifier to generate classification output, at 504. For example, the first ML classifier may include or correspond to the first ML classifier 126 of FIG. 1, and the classification output may include or correspond to the classification output 162 of FIG. 1. The first ML classifier is trained based on historical streamed data to perform classification without using continuous learning. For example, the historical streamed data may include or correspond to the historical streamed data 114 of FIG. 1.

The method 500 includes determining whether data drift of the unlabeled data stream satisfies (e.g., is greater than) a lower threshold, at 506. For example, the data drift may be estimated or measured by the data drift monitor 122 of FIG. 1, and the lower threshold may include or correspond to the lower threshold 110 of FIG. 1. The method 500 includes providing, based on the data drift satisfying (e.g., being greater than) the lower threshold, the unlabeled data stream as input to a second ML classifier instead of the first ML classifier to generate the classification output, at 508. For example, the second ML classifier may include or correspond to the second ML classifier 128 of FIG. 1. The second ML classifier is trained to perform classification using continuous learning.

As described above, the method 500 supports adaptive ML classification that mitigates the effects of catastrophic forgetting and that efficiently use computational and memory resources. As such, the method 500 enables improved classification performance through use of continuous learning at a wider array of devices that do not meet the more stringent resource requirements and power needs of conventional continuous learning-based classifiers. For example, the method 500 dynamically switches between both a first ML classifier (e.g., a less complex, non-CL classifier) and a second ML classifier (e.g., a more complex, CL classifier) based on data drift to balance between classification performance and resource use in a manner that satisfies target performance metrics. As such, performing the method 500 provides classification services in a streaming data context that mitigate the effects of catastrophic forgetting in a resource-efficient and scalable manner, thereby providing significant performance, complexity/scalability, and cost improvements over both conventional static ML classifiers and conventional continuous learning ML classifiers.

It is noted that other types of devices and functionality may be provided according to aspects of the present disclosure and discussion of specific devices and functionality herein have been provided for purposes of illustration, rather than by way of limitation. It is noted that the operations of the method 400 of FIG. 4 and/or the method 500 of FIG. 5 may be performed in any order, or that operations of one method may be performed during performance of another method, such as the method 500 of FIG. 5 including one or more operations of the method 400 of FIG. 4. It is also noted that the method 400 of FIG. 4 and/or the method 500 of FIG. 5 may also include other functionality or operations consistent with the description of the operations of the system 100 of FIG. 1, the process flow 200 of FIG. 2, the ML classifier 300 of FIG. 3, or a combination thereof.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-5) include processors, electronics devices, hardware devices, electronics components, logical circuits, memories, software codes, firmware codes, among other examples, or any combination thereof. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits, and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules, and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. In some implementations, a processor may also be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media can include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, hard disk, solid state disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, various terminology is for the purpose of describing particular implementations only and is not intended to be limiting of implementations. For example, as used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). The term "coupled" is defined as connected, although not necessarily directly, and not necessarily mechanically; two items that are "coupled" may be unitary with each other. the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified—and includes what is specified; e.g., substantially 90 degrees includes 90 degrees and substantially parallel includes parallel—as understood by a person of ordinary skill in the art. In any disclosed aspect, the term "substantially" may be substituted with "within [a percentage] of" what is specified, where the percentage includes 0.1, 1, 5, and 10 percent; and the term "approximately" may be substituted with "within 10 percent of" what is specified. The phrase "and/or" means and or.

Although the aspects of the present disclosure and their advantages have been described in detail, it should be understood that various changes, substitutions and alterations can be made herein without departing from the spirit of the disclosure as defined by the appended claims. Moreover, the scope of the present application is not intended to be limited to the particular implementations of the process, machine, manufacture, composition of matter, means, methods and processes described in the specification. As one of ordinary skill in the art will readily appreciate from the present disclosure, processes, machines, manufacture, compositions of matter, means, methods, or operations, presently existing or later to be developed that perform substantially the same function or achieve substantially the same result as the corresponding aspects described herein may be utilized according to the present disclosure. Accordingly, the appended claims are intended to include within their scope such processes, machines, manufacture, compositions of matter, means, methods, or operations.

What is claimed is:

1. A method for adaptive machine learning classification that mitigates effects of catastrophic forgetting, the method comprising:
   receiving, by one or more processors, an unlabeled data stream;
   providing, by the one or more processors, the unlabeled data stream as input to a first machine learning (ML) classifier to generate classification output,
      wherein the first ML classifier is trained based on historical streamed data to perform classification without using continuous learning;
   determining, by the one or more processors, whether data drift of the unlabeled data stream satisfies a lower threshold; and
   providing, by the one or more processors and based on the data drift satisfying the lower threshold, the unlabeled data stream as input to a second ML classifier instead of the first ML classifier to generate the classification output,
      wherein the second ML classifier is trained to perform classification using continuous learning.

2. The method of claim 1, further comprising:
   determining, by the one or more processors, whether the data drift of the unlabeled data stream after expiration of a time period satisfies the lower threshold, the time period initiated upon providing the unlabeled data stream as input to the second ML classifier; and
   providing, by the one or more processors and based on the data drift no longer satisfying the lower threshold, the unlabeled data stream as input to the first ML classifier instead of the second ML classifier to generate the classification output.

3. The method of claim 2, further comprising, prior to expiration of the time period:
   receiving, by the one or more processors, labels corresponding to a portion of the unlabeled data stream provided to the second ML classifier; and further training, by the one or more processors, the second ML classifier based on the labels and the portion of the unlabeled data stream.

4. The method of claim 1, further comprising:
determining, by the one or more processors, whether the data drift of the unlabeled data stream after expiration of a time period satisfies an upper threshold, the time period initiated upon providing the unlabeled data stream as input to the second ML classifier;
performing, by the one or more processors and based on the data drift satisfying the upper threshold, clustering on a profile of the unlabeled data stream after expiration of the time period to segment the unlabeled data stream into multiple profile clusters; and
training, by the one or more processors, multiple ML classifiers based on the multiple profile clusters,
wherein each ML classifier of the multiple ML classifiers is trained based on a corresponding profile cluster to perform classification without using continuous learning.

5. The method of claim 4, where the clustering comprises affinity propagation clustering.

6. The method of claim 4, further comprising:
sampling, by the one or more processors, a first portion of the unlabeled data stream to generate a first input sample;
determining, by the one or more processors, distances between the first input sample and centroids of the multiple profile clusters;
identifying, by the one or more processors, a closest profile cluster for the first input sample having a shortest distance of the distances; and
providing, by the one or more processors, the first portion of the unlabeled data stream as input to a ML classifier of the multiple ML classifiers that corresponds to the closest profile cluster for the first input sample to generate the classification output.

7. The method of claim 6, wherein the distances comprise Euclidian distances between the first input sample and the centroids.

8. The method of claim 6, further comprising:
sampling, by the one or more processors, a second portion of the unlabeled data stream to generate a second input sample;
determining, by the one or more processors, second distances between the second input sample and the centroids;
identifying, by the one or more processors, a closest profile cluster for the second input sample having a shortest distance of the second distances; and
providing, by the one or more processors, the second portion of the unlabeled data stream as input to a ML classifier of the multiple ML classifiers that corresponds to the closest profile cluster for the second input sample to generate the classification output.

9. The method of claim 6, wherein:
the multiple profile clusters comprise a first profile cluster, a second profile cluster, and a third profile cluster;
the multiple ML classifiers comprise a first new ML classifier trained based on the first profile cluster, a second new ML classifier trained based on the second profile cluster, and a third new ML classifier trained based on the third profile cluster; and
the first portion of the unlabeled data stream is provided to the first new ML classifier based on a distance between the first input sample and a centroid of the first profile cluster being shorter than a distance between the first input sample and a centroid of the second profile cluster and a distance between the first input sample and a centroid of the third profile cluster.

10. A system for adaptive machine learning classification that mitigates effects of catastrophic forgetting, the system comprising:
a memory; and
one or more processors communicatively coupled to the memory, the one or more processors configured to:
receive an unlabeled data stream;
provide the unlabeled data stream as input to a first machine learning (ML) classifier to generate classification output,
wherein the first ML classifier is trained based on historical streamed data to perform classification without using continuous learning;
determine whether data drift of the unlabeled data stream satisfies a lower threshold; and
based on the data drift satisfying the lower threshold, provide the unlabeled data stream as input to a second ML classifier instead of the first ML classifier to generate the classification output,
wherein the second ML classifier is trained to perform classification using continuous learning.

11. The system of claim 10, wherein the one or more processors are configured to determine whether the data drift satisfies the lower threshold using adaptive windowing (ADWIN).

12. The system of claim 10, wherein the second ML classifier is trained using an elastic weight consolidation (EWC) technique, an online elastic weight consolidation (OEWC) technique, or a robust elastic weight consolidation (REWC) technique.

13. The system of claim 10, wherein the second ML classifier is trained based on a robust elastic weight consolidation (REWC) loss function, L, given by the following:

$$\mathcal{L}(\theta) = \mathcal{L}_N(\theta) + \sum_i \frac{\lambda}{2} F *_{n-1,i} (\theta_i - \theta *_{n-1,i})^2 + \sum_i \frac{\lambda}{2} F_{n-1,i} |\theta_i - \theta *_{n-1,i}|$$

wherein θ is an input configuration of neural networks parameters, θ* is a target configuration of neural network parameters, n is a total number of tasks, Σ is data, λ is a hyperparameter corresponding to success on older tasks, and F is a Fisher information matrix.

14. The system of claim 10, wherein the lower threshold comprises a learned threshold limit associated with the first ML classifier.

15. The system of claim 10, wherein the one or more processors are further configured to, prior to a determination that the data drift satisfies the lower threshold, train the second ML classifier based on the historical streamed data, at least a portion of the unlabeled data stream received prior to the determination, and received labels corresponding to the at least the portion of the unlabeled data stream.

16. The system of claim 10, wherein the one or more processors are further configured to, based on the data drift failing to satisfy the lower threshold, continue to provide the unlabeled data stream as input to the first ML classifier to generate the classification output.

17. A non-transitory computer-readable storage medium storing instructions that, when executed by one or more processors, cause the one or more processors to perform operations for adaptive machine learning classification that mitigates effects of catastrophic forgetting, the operations comprising:
   receiving an unlabeled data stream;
   providing the unlabeled data stream as input to a first machine learning (ML) classifier to generate classification output,
      wherein the first ML classifier is trained based on historical streamed data to perform classification without using continuous learning;
   determining whether data drift of the unlabeled data stream satisfies a lower threshold; and
   based on the data drift satisfying the lower threshold, providing the unlabeled data stream as input to a second ML classifier instead of the first ML classifier to generate the classification output,
      wherein the second ML classifier is trained to perform classification using continuous learning.

18. The non-transitory computer-readable storage medium of claim 17, wherein the operations further comprise:
   based on the data drift of the unlabeled data stream satisfying an upper threshold after expiration of a time period initiated upon providing the unlabeled data stream as input to the second ML classifier, performing clustering on a profile of the unlabeled data stream after expiration of the time period to segment the unlabeled data stream into multiple profile clusters; and
   training each of multiple ML classifiers based on a corresponding one of the multiple profile clusters to perform classification without using continuous learning.

19. The non-transitory computer-readable storage medium of claim 18, wherein the upper threshold comprises a withstand capacity associated with the second ML classifier.

20. The non-transitory computer-readable storage medium of claim 18, wherein the operations further comprise:
   sampling a portion of the unlabeled data stream to generate an input sample; and
   providing the portion of the unlabeled data stream as input to a particular ML classifier of the multiple ML classifiers to generate the classification output,
      wherein the particular ML classifier corresponds to a profile cluster of the multiple profile clusters having a centroid that is a shorter distance from the first input sample than centroids of the remaining profile clusters of the multiple profile clusters.

* * * * *